(12) United States Patent
Blake et al.

(10) Patent No.: US 6,388,347 B1
(45) Date of Patent: May 14, 2002

(54) FLYWHEEL BATTERY SYSTEM WITH ACTIVE COUNTER-ROTATING CONTAINMENT

(75) Inventors: H. Wayland Blake, Oak Ridge, TN (US); Edward S. Zorzi, Ballston Lake, NY (US)

(73) Assignee: Trinity Flywheel Power, Livermore, CA (US)

( * ) Notice: Subject to any disclaimer, the term of this patent is extended or adjusted under 35 U.S.C. 154(b) by 0 days.

(21) Appl. No.: 09/248,520

(22) Filed: Feb. 9, 1999

Related U.S. Application Data

(60) Provisional application No. 60/074,009, filed on Feb. 9, 1998.

(51) Int. Cl.[7] .......................... H02K 16/02; H02K 7/09; H02K 7/02
(52) U.S. Cl. .................. 310/74; 310/90.5; 310/266; 310/83; 74/572
(58) Field of Search .................. 310/90.5, 74, 266, 310/112, 114, 75 D, 83; 74/572, 574

(56) References Cited

U.S. PATENT DOCUMENTS

| | | | | | |
|---|---|---|---|---|---|
| 396,355 | A | * | 1/1889 | Dyer ........................... | 310/112 |
| 3,022,433 | A | * | 2/1962 | Ferranti ....................... | 310/74 |
| 4,088,041 | A | * | 5/1978 | Kraus .......................... | 74/572 |
| 5,012,694 | A | | 5/1991 | McGrath ..................... | 74/572 |
| 5,124,605 | A | * | 6/1992 | Bitterly et al. ................ | 310/74 |
| 5,614,777 | A | * | 3/1997 | Bitterly et al. ................ | 310/74 |

* cited by examiner

Primary Examiner—Karl Tamai
(74) Attorney, Agent, or Firm—Woodcock Washburn LLP

(57) ABSTRACT

Flywheel battery systems having improved energy density are provided. Such systems preferably have an inner rotor mounted coaxially and substantially cylindrically within an outer containment rotor. The outer rotor counter-rotate relative to said inner rotor so as to manage the net gyroscopic force generated by the flywheel system. The outer rotor has a greater relative inertia as compared to said inner rotor and therefore can be rotated at a relatively lower rotational velocity to balance the gyroscopic forces generated by the rotation of the inner rotor. The relative rotational velocities of the inner and outer rotor are maintained by a combined mechanical and magnetic drive/suspension system.

17 Claims, 16 Drawing Sheets

FIG. 9E O-RING

FIG. 9D BUTTON

FIG. 9C DOUBLE

FLYWHEEL BATTERY SYSTEM WITH ACTIVE COUNTER-ROTATING CONTAINMENT

CROSS-REFERENCES

This application claims the benefit of U.S. Provisional Application Serial No. 60/074,009 filed Feb. 9, 1998.

FIELD OF TECHNOLOGY

The present invention is directed to electromechanical battery flywheel systems for energy storage and power delivery. More particularly, the present invention is directed toward flywheel energy storage systems having a variable speed, counter-rotating containment vessel for mechanical containment of high speed rotors and managing net momentum and net external gyroscopic forces.

BACKGROUND OF THE INVENTION

Generally, battery flywheel systems comprise a single high-speed rotor which is mounted on a central shaft and which is supported by bearings attached to each end of the shaft. The flywheel and shaft are often enveloped within a heavy stationary containment vessel which is generally evacuated to minimize energy losses. In such arrangements, the shaft bearings are attached to the end plates of the flywheel containment vessel and the rotor is driven by one or more motor/generators mounted to the end plate. It has been proposed that flywheel energy storage systems be used in terrestrial (e.g. electrical) and extra-terrestrial (e.g. satellite) vehicles. However, management of momentum together with substantial gyroscopic forces associated with many prior flywheel storage system designs has impeded development in this area. In a flywheel system, gyroscopic forces arise from prescribed angular rotation of the flywheel about directions not coincident with the flywheel spin axis. Such forces result when the motion of the vehicle in which the flywheel is mounted are imposed on the flywheel rotor. Thus, when a vehicle having a flywheel situated therein undergoes a change in direction, gyroscopic forces may result which are orthogonal to the imposed movement. The gyroscopic forces grow larger with the size of the flywheel, with the rate of change and direction of the imposed motion, and with the speed at which the flywheel rotates about its spin axis.

Several methods have been suggested to compensate for the external gyroscopic forces associated with flywheels. A first method involves gimbal mounting the flywheel containment vessel so as to avoid or minimize the external gyroscopic moments that would result if the containment cylinder were rigidly attached to the vehicle. Rigid attachment of a single flywheel to the flywheel containment cylinder results in direct transfer of the external gyroscopic forces to the vehicle. Although the gimbal mount is effective in preventing transfer of vehicle motion to the flywheel, the gimbal mount provides a relatively weak mechanical connection between the flywheel containment cylinder and the vehicle. In the event of flywheel failure, large forces and moments may be applied to the gimbal which could well exceed the strength of the mechanical connection of the gimbal. Further, some gimbal designs compensate for limited degrees of motion. If the motion of the vehicle exceeds the limited degree of motion for which the gimbal is designed to compensate, the gyroscopic forces are transferred to the vehicle. Thus, the mechanical limitations of the gimbal may preclude it in some applications from being a satisfactory solution to the problem of gyroscopic forces.

Another method for preventing external gyroscopic forces from being exerted on a vehicle having a flywheel therein involves utilizing two coaxial, counter-rotating flywheels or rotors as disclosed in U.S. Pat. No. 5,124,605, entitled, "A Flywheel-Based Energy Storage Methods and Apparatus" rather than a single flywheel. The application of two rotors also provides momentum management which is particularly useful in satellite operation when charging or discharging a flywheel system. The object of the multiple flywheel design is to counter-rotate two flywheels so as to control momentum and produce a net zero external gyroscopic force. In most such embodiments, two identical flywheels are mounted onto a single or separate shaft with each flywheel being driven by (and driving) a separate motor. The success of this method of preventing gyroscopic forces and managing momentum depends upon synchronizing the operating frequencies of the counter-rotating flywheels. Such systems still require heavy stationary containment vessels in addition to the multiple rotors in order to insure safe operation. Indeed, a shortcoming of prior flywheel systems in general is the need for heavy stationary containment vessels which offer protection during flywheel failure. In the event of a sudden failure of a flywheel rotor, the large angular momentum of the high-speed flywheel rotor can be rapidly transferred to a containment cylinder. In conventional flywheel systems, the containment cylinder does not rotate and is rigidly attached to the vehicle. Strong and heavy attachments are required to prevent angular motion of the containment cylinder during (and immediately after) a flywheel burst. Some prior systems have a second stationary inner containment vessel which is free, although not driven, to rotate inside the outer containment cylinder. Such prior art systems operate by imparting some of the energy dispersed during a flywheel failure onto the inner containment cylinder which is free to rotate and dissipate energy. Under a burst rotor scenario the flywheel angular momentum is transferred first to the inner cylinder and then to the outer cylinder and ultimately to the vehicle. Thus despite the use of multiple containment cylinders, the prior art does not adequately isolate the vehicle from reaction forces resulting during flywheel failure. Further, the use of multiple large cylinders for containment generally produces an overweight and impractical design for mobile deployment.

A farther shortcoming of prior flywheel systems is the inability to simultaneously provide adequate torque and power. Typically, in prior systems, a motor/generator is directly coupled to the high-speed energy storage rotor and is the only source of torque and power. Because currently available high-speed motor/generators are limited in torque and power capacity, the flywheel battery is likewise limited.

In general, the maximum torque and horsepower which a motor/generator an produce depends primarily on the physical size of the motor. The high-speed motors which are typically used in flywheel systems are necessarily small in size because the rotating elements of the motor must withstand the high rotational stresses produced by the very high rotational frequency of the flywheel. In contrast, more powerful motors are large in size and operate at lower rotational frequencies than current state-of-the-art flywheel rotors. The maximum torque which a high-speed motor/generator is capable of producing is limited by the interacting magnetic fields located within the motor. In other words, the maximum torque for a given motor is determined by the number of magnetic poles located on the motor as well as the strength, volume and mean diameter of the permanent magnets. A motor/generator with a large diameter has sufficient room for a greater number of magnetic poles than a motor/generator with a small diameter; therefore a motor/generator with a large diameter can be designed with a higher maximum torque capacity. Thus, for configurations where the high speed rotor and motor are directly coupled, the diameter of the motor/generator limits the torque capacity of the system.

The torque limitation of the prior art is important to applications which require large power transfer during charge and discharge from a single energy storage unit. One such application is a hybrid electric vehicle where the primary function of the flywheel is to provide peak power to the vehicle drive train when vehicle power demand exceeds the horsepower capacity of the internal combustion engine. Another such application where the torque limitation is important, is satellite control systems which use motor reaction torques for altitude control. Thus, there is a need in the art for a flywheel battery system which can provide broader torque and power characteristics.

Still another shortcoming of prior art flywheel systems is the suspension/drive systems. Prior flywheel system suspension designs, whether single or multiple rotor configurations, require that the primary bearings, which are generally magnetic but also could be mechanical, and the secondary bearings, which are generally contact bearings used in the case of failure of the primary magnetic bearings, be connected directly to the high speed rotor. Application of such bearings to high speed applications results in eddy currents and frictional losses both of which increase with rotational frequency. There is a need in the art for a low loss bearing suspension system which offers full support during high speed flywheel rotor operation but which minimizes energy loss and undesirable heat build-up.

Accordingly, there remains a need for a flywheel energy storage system that minimizes net gyroscopic forces, manages momentum, minimizes bearings suspension losses, minimizes forces transferred to the vehicle during failure of the flywheel rotor, and provides adequate torque and power. It is also desired to provide such systems with higher energy densities simultaneous with higher power densities. The present invention is directed to these, as well as other, important ends.

SUMMARY OF THE INVENTION

A flywheel system in accordance with the present invention overcomes the shortcomings in the prior art by providing an inner rotor and an outer rotor coaxially mounted, wherein the outer rotor substantially cylindrically surrounds the inner rotor. Each of the inner and the outer rotor are rotatable about the axis. Unlike prior flywheel systems which used multiple rotors just for gyroscopic and momentum control, the outer rotor operates as a containment vessel for the inner rotor.

According to one aspect of the inventive flywheel system, the inner rotor and the outer rotor counter-rotate about the axis. A preselected net momentum with resulting gyroscopic force can be generated upon counter-rotation of the inner and outer rotors. In one embodiment, an essentially net zero external gyroscopic force results upon counter-rotation of the inner and outer rotors. Generally, the inner rotor has an inertia relatively less than the inertia of the outer rotor but rotates at higher speeds. The flywheel system may also be enclosed in a vacuum.

The inventive flywheel system comprises a means for coupling and suspending the inner rotor and the outer rotor so as to manage the relative rotational velocities of the inner rotor and the outer rotor and thereby generate a preselected net momentum.

In one embodiment of the invention, the flywheel system comprises a drive assembly for coupling the inner rotor and the outer rotor. The drive assembly may comprise a plurality of drive wheels positioned parallel with the axis of the inner rotor at a radial distance from the center of the inner rotor. The plurality of drive wheels are movably interconnected with the inner rotor and the outer rotor whereby movement of the inner rotor is transferred through the plurality of drive wheels to the outer rotor causing the outer containment rotor to counter-rotate relative to the inner rotor. Alternatively, the drive assembly comprises the following items: a drive shaft, the inner rotor being integrally connected to the drive shaft; a plurality of bearing posts positioned parallel to the drive shaft at a radial distance away from the center of the drive shaft; and a plurality of drive wheels, one of the plurality being mounted on each of the plurality of bearing posts. The drive wheels are movably interconnected with the inner rotor and the outer rotor whereby movement of the inner rotor is transferred through the plurality of drive wheels to the outer rotor causing the outer rotor to counter-rotate relative to the inner rotor. The drive assembly may comprise the following items: a drive shaft, the inner rotor being integrally connected to the drive shaft; a shaft drive wheel rotatably mounted around the perimeter of the drive shaft, the shaft drive wheel rotating with the drive shaft; a force transfer ring integrally coupled to the outer rotor for transferring forces to and from the outer rotor, the force transfer ring rotating with the outer rotor; a plurality of beaming posts positioned parallel to the drive shaft at a radial distance away from the center of the drive shaft; a plurality of bearings movably rotatably mounted on the plurality of the bearing posts; and a plurality of drive wheels, one of the plurality being mounted on each of the bearings. The drive wheels are movably interconnected with the force transfer ring and the shaft drive wheel whereby movement of the inner rotor is transferred through the shaft drive wheel to the drive wheels, and from the drive wheels to the force transfer ring, thereby causing the outer rotor to counter-rotate relative to the inner rotor. The drive assembly may further comprise the following items: radial magnetic bearings operably coupled around the central shaft for maintaining the radial position of the shaft; and axial magnetic bearings operably coupled for maintaining the axial position of the shaft. The drive assembly may still further comprise the following elements: rotating touchdown bearings operably coupled to the central shaft for limiting flywheel excursions during shock loading; and a motor/generator for energy and power delivery.

In one embodiment of the invention, the flywheel drive assembly may comprise a drive shaft to which the inner rotor is integrally connected, and a planetary drive base which is substantially coaxially mounted with the drive shaft and rotatable about the drive shaft. The flywheel drive assembly further comprises a plurality of drive wheels rotatably attached to the planetary drive base. Each of the plurality of drive wheels is rotatable about its own axis and simultaneously rotatable about the drive shaft upon rotation of the planetary drive base. The drive wheels are movably interconnected with the inner rotor and the outer rotor whereby movement of the inner rotor is transferred through the plurality of drive wheels to the outer rotor causing the outer rotor to counter-rotate relative to the inner rotor.

In another embodiment of the system, the flywheel drive assembly may comprise an inner rotor rotatable about a first axis and an outer rotor counter-rotatable about a second axis which intersects on at least one dimensional plane with the first axis. The outer rotor substantially surrounds the inner rotor. A first motor/generator operably coupled to the inner rotor causes the inner rotor to rotate about the first axis, A second motor/generator operably coupled to the second rotor causes the outer rotor to counter-rotate about the second axis relative to the first axis. The relative net momentum of the inner rotor and the outer rotor is controllable by the relative rotational velocities of the inner and outer rotor.

In one embodiment of the invention, the flywheel system comprises the following items: a first motor/generator capable of relative high rotational speeds operably connected to the first rotor; and a second motor/generator capable of lower rotational speeds relative to the first motor/generator but having a relatively greater torque capacity than the first motor/generator, operably connected to the second rotor.

Thus, there is disclosed in a flywheel system for storing energy comprising a first rotor and a second rotor counter-rotating relative to the first rotor, the combination wherein the first rotor has a relative low inertia and high rotational velocity as compared to the second rotor and is situated substantially internal to the second rotor which has a relatively large inertia and lower rotational velocity as compared to the first rotor and wherein the relative rotational velocities of the first rotor and the second rotor are maintained by a mechanical and magnetic drive assembly.

According to another aspect of the invention, there is disclosed a method of operating a flywheel system comprising first and second rotors, the second rotor being located substantially within the first rotor and having a relatively smaller mass than the first rotor. The method comprises the following steps; rotating the first rotor; and counter-rotating the second rotor relative to the first rotor at a relative lower rotational velocity so as to produce a managed momentum balance between the first rotor and the second rotor. According to another aspect of the invention, there is disclosed a method for releasable storing energy in mechanical form. The method comprises the following steps: transferring the energy into each of an inner and an outer coaxially mounted counter-rotatable rotor, the outer rotor being substantially cylindrically surrounding the inner rotor; and rotating one of the rotors, while counterrotating the other of the rotor. In one embodiment, the counterrotation gives rise to a preselected net momentum balance. The preselected net momentum may be zero.

According to another aspect of the invention, there is disclosed a vehicle having a flywheel energy storage system comprising the following items: a first rotor; a second rotor located substantially around and counter-rotating relative to the first rotor and having a relatively large mass and lower rotational velocity as compared to the first rotor; a drive assembly integrally coupled to the first rotor and the second rotor for maintaining constant relative rotational velocities between the first and the second rotor so as to produce a managed angular momentum balance between the first rotor and the second rotor. In one embodiment the vehicle is a terrestrial vehicle.

According to another aspect of the invention, there is disclosed a minimal weight, maximum energy and maximum specific energy rotor. The inventor rotor comprises the following items: an inner rim; an outer rim; a spacer ring which is interference fit to the outer rim; a tapered transition section extending between the inner rim and the outer rim, the transition section attached to the outer rim at the spacer ring; a stiffness over-wrap surrounding the inner rim for securing the transition section to the inner; and a growth ring to assist in compatibility of radial deformation between the transition section, the spacer ring, and the rim.

The inner rim, outer rim, and transition section are preferably manufactured from a composite material. The transition section may have a varying thickness. A minimal weight, maximum energy and maximum specific energy flywheel system having a rotor, wherein the rotor comprises the following items: an inner rim manufactured from composite material; an outer rim manufactured from composite material; a spacer ring, the spacer ring interference fit to the outer rim; a tapered transition section extending between the inner rim and the outer rim, the transition section attached to the outer rim at the spacer ring; a stiffness over-wrap surrounding the inner rim for securing the transition section to the inner; and a growth ring to assist in compatibility of radial deformation between the transition section, the spacer ring, and the outer rim.

BRIEF DESCRIPTION OF THE DRAWINGS

The objects and advantages of the invention will become more apparent and more readily appreciated from the following detailed description of presently preferred exemplary embodiments of the invention taken in conjunction with the accompanying drawings, of which.

DETAILED DESCRIPTION OF PREFERRED EMBODIMENTS

The present invention provides an electromechanical flywheel battery system comprising an energy storage rotor and a counter-rotating containment vessel. In the preferred embodiment, the energy storage rotor rotates at a high frequency relative to the containment vessel which has a larger relative mass moment of inertia. The combined net rotational momentum of the relative high frequency, low inertia energy storage rotor and the counter-rotating lower frequency, high mass containment vessel can be managed so as to output a preselected net momentum resulting in a net gyroscopic force. In the preferred embodiment, the preselected net momentum is zero. The relative rotational frequencies of the energy storage rotor and the containment vessel are maintained by an inventive mechanical/magnetic suspension/drive system. Reaction forces generated during failure of the energy storage rotor are dissipated by the counter-rotating containment vessel. Because the containment vessel has greater inertia than prior art flywheels and therefore rotates at a lower frequency, a more powerful and robust motor/generator, which is capable of generating greater torque than the motor/generators used in most high speed flywheels, can be employed to drive the containment vessel. The high speed rotor is specially designed to compensate for radial growth and also to be sufficiently stiff so as to be an adequate torque transfer medium.

Figure 1:
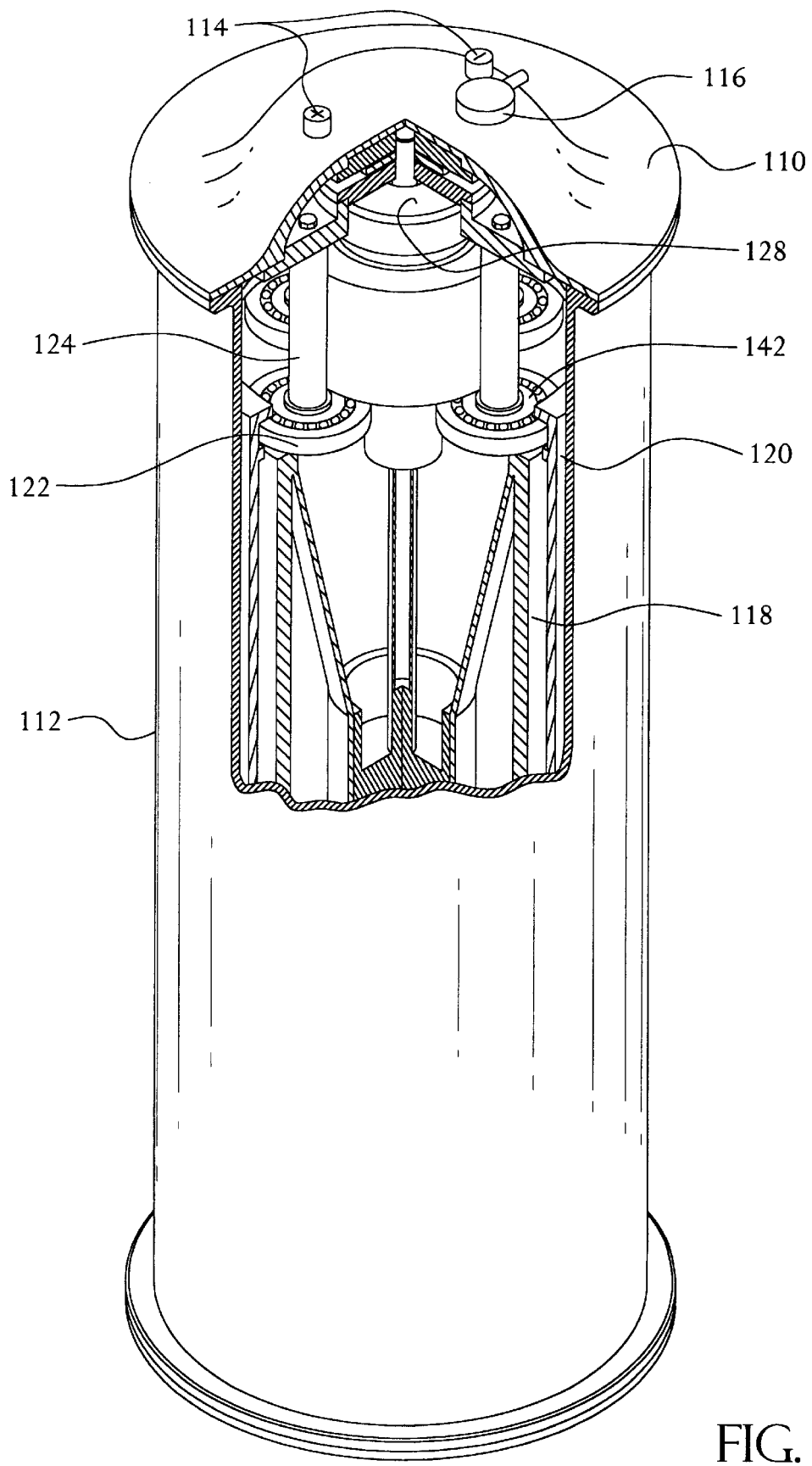
FIG. 1 provides a perspective view of a preferred embodiment of the inventive flgwheel battery system.

FIG. 1 provides a perspective view, partially in section, of a preferred embodiment of the inventive electromechanical flywheel battery system. The system comprises end cap 110 coupled with vacuum cylinder 112 so as to form a vacuum within. Projecting from end cap 110 are battery terminals 114 and vacuum vent 116. When the battery system is in charge mode, battery terminals 114 present energy to the system. When the battery system is in generator mode, battery terminals 114 are employed to remove energy from the system. The flywheel system further comprises energy storage rotor 118 and counter-rotating containment rotor 120. Containment rotor 120 and energy storage rotor 118 are operably interconnected via drive wheels 122 which are supported by bearing posts 124. A motor-generator 128 converts electrical energy into rotational kinetic energy of rotors 118, 120 and in the generator mode reverses that energy exchange to provide electric energy from the battery by depleting the kinetic energy of rotors 118 and 120.

Figure 2:
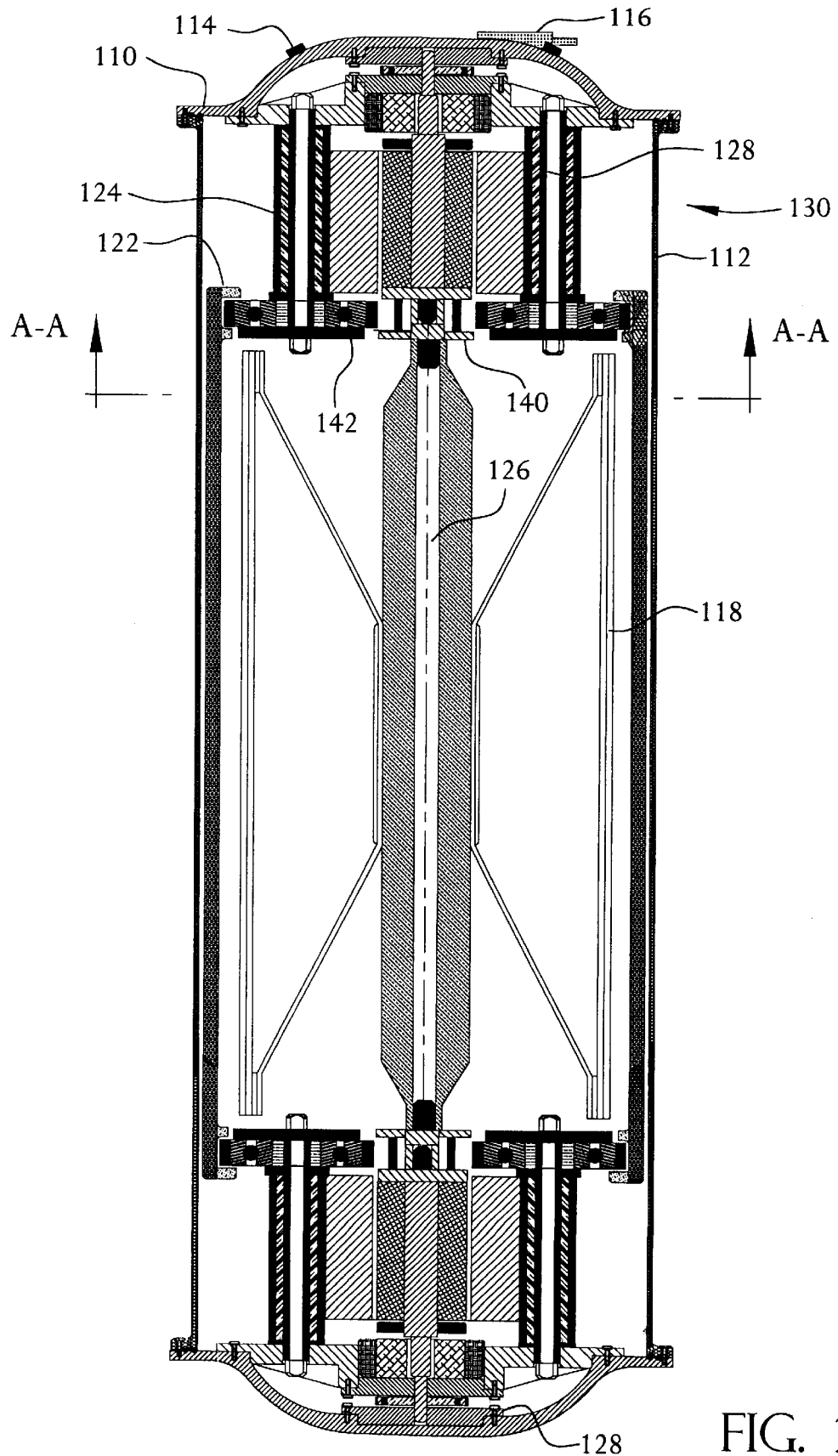
FIG. 2 provides a sectional perspective view of a preferred embodiment of the inventive flywheel battery system.

FIG. 2 provides a perspective sectional view of the flywheel battery system of FIG. 1. Energy storage rotor 118 and containment rotor 120 counterrotate, often at differing frequencies, about a common or coincidental axis or shaft 126. Of course it is envisioned that energy storage rotor 118 and containment rotor 120 might alternatively rotate about different axis which intersect the same geometric plane. Containment rotor 120 is larger and generally has greater mass moment of inertia than energy storage rotor 118. Energy storage rotor 1 18 is located substantially within containment rotor 120 and preferably counter-rotates at a relative higher frequency than containment rotor 120. In the preferred embodiment, motor/generators 128 for applying and removing energy are applied to each end of the system.

In contrast to other dual rotor systems which require electrical synchronization of two separate motors which drive two non-concentric, linearly arranged rotors as in U.S. Pat. No. 5,124,605, the relative rotational frequencies of rotors 118 and 120 in the present system can be maintained mechanically or electrically by combined suspension/drive assembly system 130. Indeed, in one embodiment of the present system described below with reference to FIG. 10, a single motor/generator is employed to drive the entire system while allowing suspension/drive system 130 to synchronize the relative rotations of rotors 118 and 120. Net zero angular momentum control can be achieved by controlling the inertias and frequencies of rotors 118 and 120 rather than by the synchronization of separate drive motor/generators. A net zero angular momentum eliminates external gyroscopic moments so that the flywheel system can be rigidly attached to a vehicle or object. The relative rotations, velocities and mass of energy storage rotor 118 and containment rotor 120 can be varied so as to manage the net external gyroscopic forces and achieve a preselected and even varying net momentum and external gyroscopic force.

It should be noted that although the preferred embodiment of the present system relies upon the electromechanical means of suspension/drive system 130 to manage net momentum, alternative embodiments such as are described below with reference to FIGS. 12 and 13 employ electrical synchronization of multiple motors/generators to manage net momentum. As described below, these embodiments offer certain benefits that make them attractive for use in particular application environments.

In the present system, containment rotor 120 can be made to counterrotate around energy storage rotor 118 with a fixed frequency relative to high-speed energy storage rotor 118. In contrast to prior systems in which non-rotating containment cylinders added parasitic mass to the overall system, in the present system containment rotor 120 is an additional energy storage device which provides improved system energy storage efficiency. Because of its lower speed of rotation, containment rotor 120 can be heavier and stronger than traditional energy storage rotors. Further, because of its increased size, containment rotor 120 has a higher rotational mass inertia than high-speed energy storage rotor 118 so that lower rotational speeds of containment rotor 120 can impart comparable yet opposite momentum as imparted by high speed rotor 118. The relative inertias and frequencies of containment rotor 120 and energy rotor 118 are controlled so as to manage momentum and external gyroscopic forces. It should be noted that in alternative embodiments, containment rotor 120 could be composed of lighter weight material. Of course, minimized weight in containment rotor 120 lessens its momentum balancing effect which can be offset by geometric considerations in design of containment rotor 120. Primary energy storage rotor 118 and secondary energy storage and containment rotor 120 are managed so as to produce a net zero gyroscopic force during flywheel operation. In the event of catastrophic failure of energy storage rotor 118, flywheel fragments and debris impact against the interior of counter-rotating containment rotor 120 and transfer angular momentum to containment rotor 120 rather than to the environment. The impact of the fragments which move in a rotational direction opposite the rotation of containment rotor 120 slows the rate of rotation of containment rotor 120. As a result of inventive suspension/drive system 130 through which containment rotor 120 and energy storage rotor 118 are inter-connected, the transfer of angular momentum of the energy storage rotor 118 fragments to counter-rotating containment rotor 120 causes the flywheel system to rapidly come to rest without large reaction torques imparted to the vehicle or body to which the system is attached. By conservation of angular momentum, the reaction torques generated by burst debris which in prior systems were imparted on the vehicle or rigid body, have been greatly reduced or eliminated. Vacuum cylinder 112 offers limited but additional containment for further burst protection.

Figure 3:
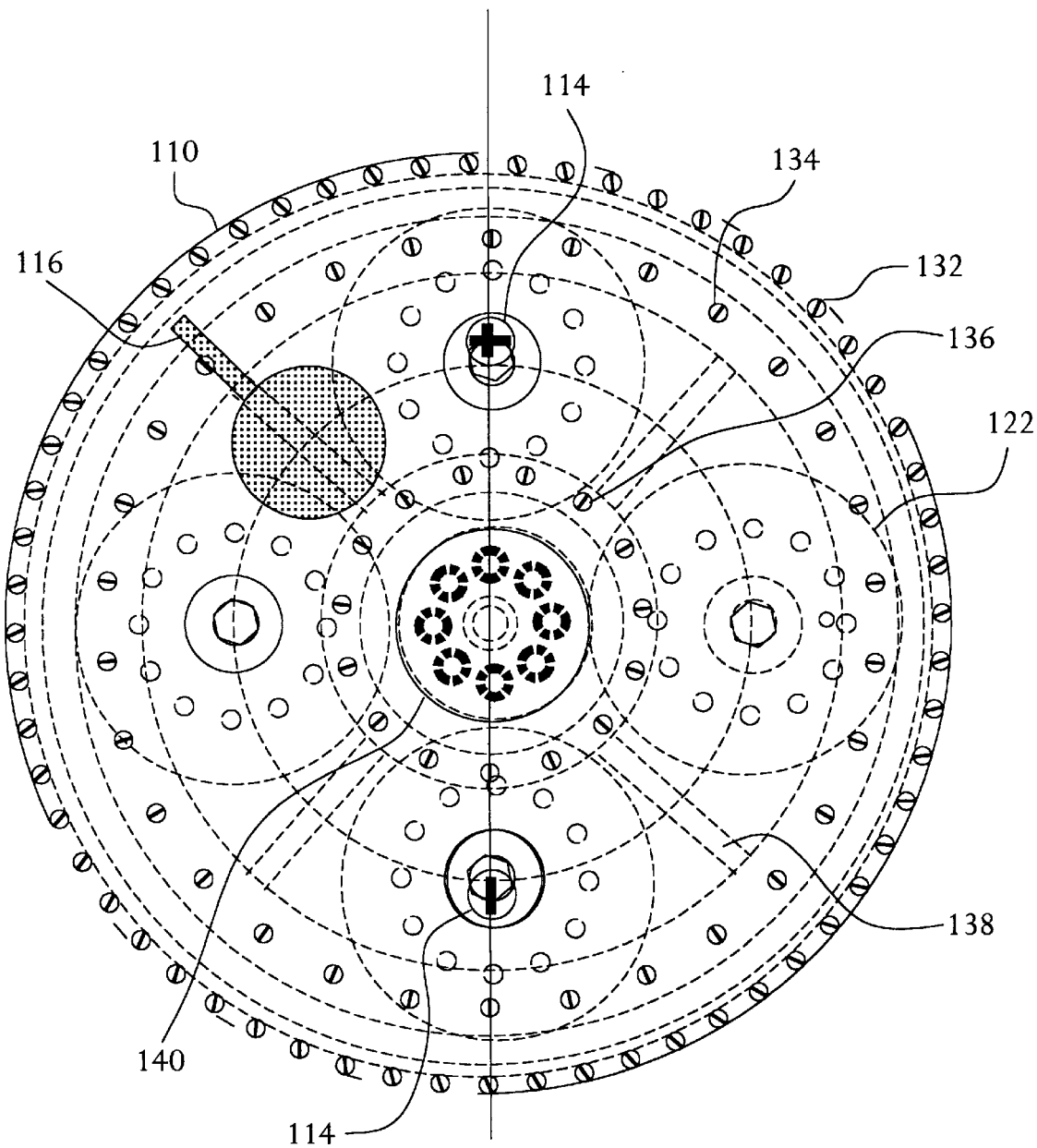
FIG. 3 provides a top view of the inventive flywheel battery system.

FIG. 3 provides an enlarged top view of the flywheel battery system. End caps 110 located at opposite ends of the battery system together with vacuum cylinder 112 provide a sealed vacuum environment suitable for a variety of terrestrial and space applications. Multiple attachment points and screws 132, 134, 136 are used for attaching end caps 110 to radial reinforcement 138 and vacuum cylinder 112. Battery terminals 114 for extraction and replenishment of flywheel energy extend from end cap 110. Similarly, vacuum vent 116 for use in evacuating the flywheel battery extends from end cap 110. Drive wheels 122 for coupling energy storage rotor 118 and containment rotor 120 are shown in dashed lines arranged radially around shaft drive wheel 140.

Figure 4:
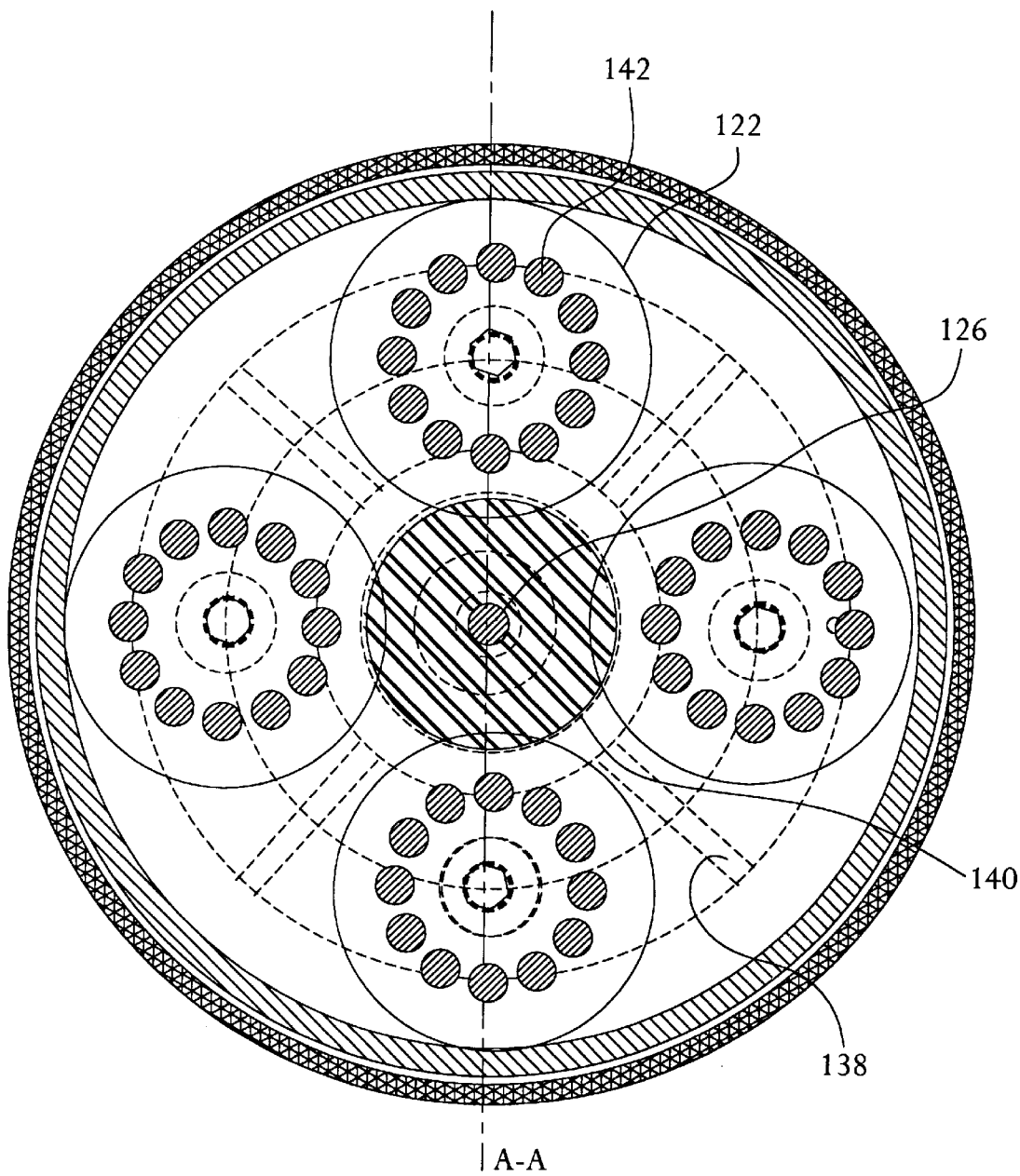
FIG. 4 provides a detailed sectional view of the interior of the drive/suspension system taken along line A—A of FIG. 2.

FIG. 4 provides an enlarged interior view taken along reference line A—A of FIG. 2. As shown, the orbital positions of the mechanical bearings 142 and drive wheels 122 mounted on bearing posts 124 are generally equally spaced from rotor shaft 126. Drive wheels 122 interact with containment rotor 120 and shaft drive wheel 140 as described in further detail below so as to couple rotors 118 and 120. Radial reinforcements 138 are constructed to maximize rigidity of the static structure as well as to minimize vibration deflections. It should be noted that although the system described herein comprises four sets of bearings 142 and drive wheels 122, the number of such combinations may vary.

Figure 5:
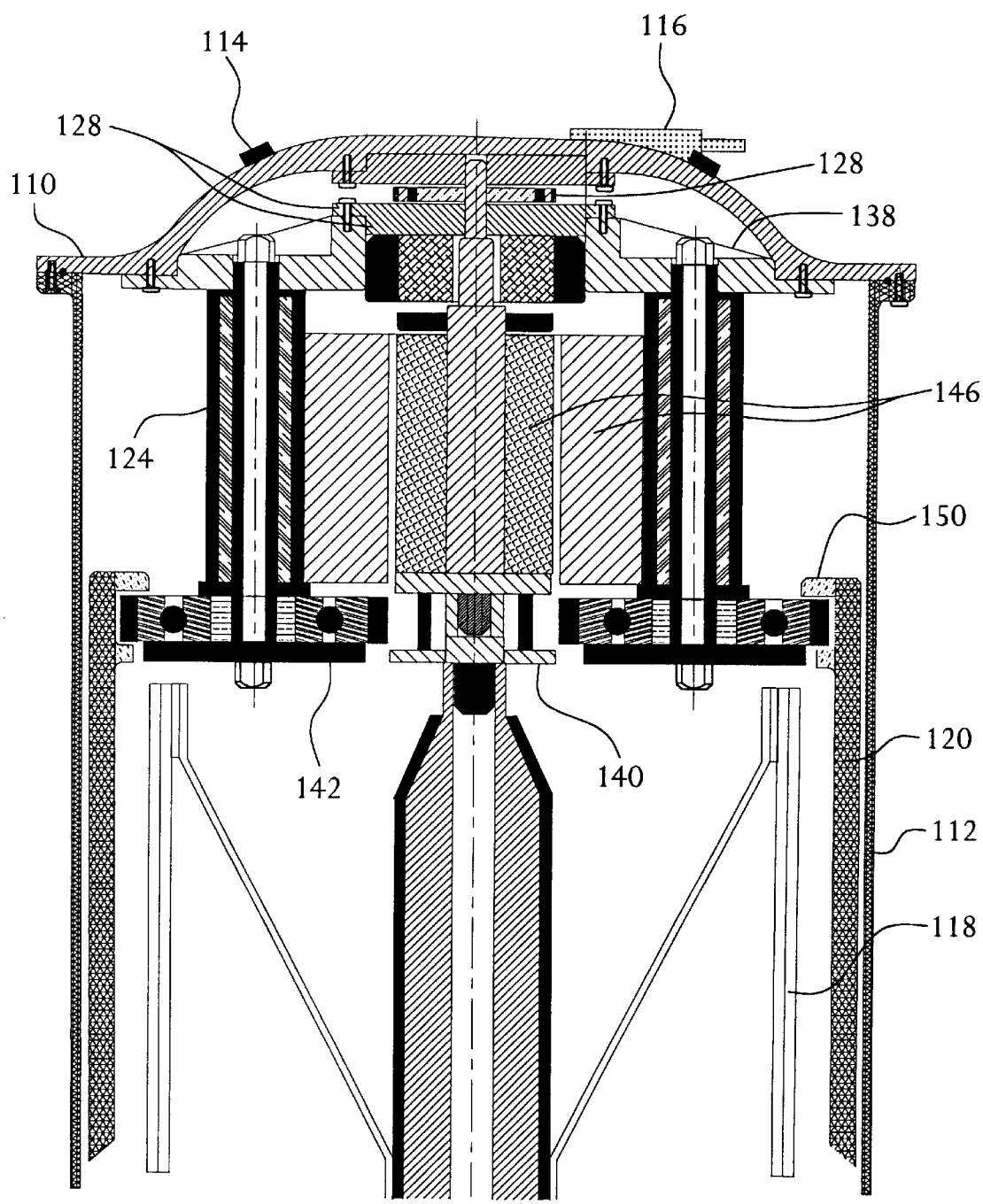
FIG. 5 provides an enlarged detailed view of the combined suspension/drive system of the inventive flywheel system of FIG. 1.

FIG. 5 provides a detailed sectional view of inventive combined suspension/drive assembly 130. Motor/generator 128 converts electrical energy into rotational kinetic energy for rotors 118 and 120, and in the generator mode reverses the energy exchange to provide electric energy from the battery by depleting the kinetic energy of rotors 118 and 120. High-speed energy storage rotor 118 is coupled to shaft 126, and is suspended by a hybrid mechanical/magnetic bearing system 146, 148. Active magnetic bearings 146, 148, magnetically coupled to each end of shaft 126, provide radial 146 and axial 148 position control. Magnetic bearings 146 and 148 also serve to provide active balance correction as well as minimize disturbances from undesired noise and vibration sources.

Mechanical bearings 142 are coupled to an end of each of post 124 that are arranged radially about shaft 126. Multiple posts 124 (only two are shown in FIG. 5) are arranged around shaft 126. The number of posts 124 may vary. Each bearing 142 has bearing drive wheel 122 coupled thereto. Bearing drive wheels 122 operate to mechanically and magnetically couple rotor 118 via shaft drive wheel 140, and containment rotor 120 via force transfer ring 150. As described in further detail below, permanent magnets are preferably incorporated into bearing drive wheels 122 so as to facilitate coupling and traction transfer between counter-rotating rotors 118 and 120. Depending upon the desired inertial and/or operational requirements of the system, the diameter of mechanical bearings 142 is typically greater than direct rotor shaft mounted mechanical bearings which have traditionally been used. As a result of the larger diameter, the rotational frequency of the bearings 142 is lower than that which would be associated with direct shaft mounted bearings. Further, because multiple mechanical bearings 142 share the loading of energy storage rotor 118, the net force on each mechanical bearing 142 as compared to a single shaft bearing that might have existed in other flywheels, is reduced. Thus, compared to the prior art, the present system provides for larger diameter outer race rotation mechanical bearings 142 which operate at lower rotational frequency and share smaller values of loading than bearings in other systems. Benefits of the increased bearing diameter, lower rotational frequency and lessened load include increased system reliability and extended component life.

The frequency ratio between containment rotor 120 and high-speed rotor 118 depends on the ratio of diameters of bearing drive wheels 122 and shaft drive wheels 140. The selection of frequency ratio is based on considerations such as bearing losses, bearing force requirements, rotational stresses, and vector inertias as well as momentum balance and gyroscopic loading. Such considerations also establish the maximum number of bearings 122 permitted per shaft end.

For applications wherein posts 124 are stationary, the ratio $W_c/W_r$ of the containment rotors 120 rotational velocity, $W_c$, to that of the energy storage rotors 118 rotational velocity, $W_r$, is $W_c/W_r = -1/(1+2r_{mb}/r_r)$, where $r_{mb}$ is the radius of drive wheels 122 and $r_r$ is the radius of shaft drive wheels 140. Therefore for any non-zero value of drive wheels 122 radius, even if drive wheels 122 are smaller than shaft drive 140, the ratio of rotation of containment rotor 120 is opposite to and less than the rotational frequency of the rotor 118. Generally drive wheels 122 are larger than shaft drive 140. As a result, the rotational frequency of drive wheels 122 and mechanical bearings 146 is less than the frequency of energy storage rotor 118. In certain applications drive wheels 122 which are smaller in diameter than the shaft drive 140 diameter (i.e. $r_{mb}/r_r<1$), may be employed to manage momentum of the system but will necessarily restrict the value of $W_c/W_r$ to values greater than 1/3. Higher speeds limit the life of mechanical bearings 142. For frequency ratios substantial smaller than 1/3 in the preferred embodiments, drive wheels 122 must be larger in diameter than shaft drive 140 or employ multiple motor embodiments as shown later in FIGS. 12 and 13.

Radial coupling between bearing drive wheels 122 and shaft drive wheel 140 is imposed by controlled radial and/or magnetic contact between the two. Because shaft wheel 140 and drive wheels 122 are not gears or devices imposing kinematic constraint, some slippage is tolerated. The slippage is useful when rotors are subject to unexpected loads. Further, the slippage provides the option of having a direct drive embodiment of the invention. Of course, slippage is not desirable if precise rotor speed control is required.

Bearing drive wheels 122 are coupled with force-transfer ring 150 which is an integral pat of containment rotor 120. The function of force-transferring 150 is to distribute the transverse force originating at each shaft 126 end to other bearings 142 and drive wheels 122 which are located in the same plane. The action of force-transfer ring 150 on bearing drive wheels 122 in each common plane is self equilibrating. Thus, a force applied to one side of containment rotor 120 will be born by all drive wheels 122 and not just the drive wheel 122 situated most closely to the applied force. Enforced radial contact and magnetic coupling is applied between bearing drive wheels 122 and force-transfer ring 150 to achieve this force redistribution between bearing drive wheels 122. The enforced contact between shaft drive wheel 140, bearing drive wheels 122, and force transfer ring 150 is accomplished by a combination of magnetic attractive force and mechanical fit such as an interference fit. Permanent magnets are incorporated within shaft drive wheel 140, bearing drive wheels 122, and force transfer ring 150 to provide magnetic attraction between the components. The magnitude of the magnetic forces is controlled to provide the necessary normal force to prevent slipping between rotor elements. Constant ratios of rotational frequency can thereby be maintained between the elements. The strength of the field of the permanent magnets must be balanced against tolerated magnetic and eddy current losses within bearing drive wheels 122 and bearings 142.

Alternatively or in combination with controlled magnetic forces, contact force between shaft drive wheel 140, bearing drive wheels 122, and force transfer ring 150 can be accomplished by mechanical interference fit. Under such circumstances, normal forces are maintained between the mechanical bearing interface to rotors 118 and 120 over the operational range of the high speed rotor. The minimum contact force required to prevent slipping at maximum drive torque is applied so as to provide maximum torque but also minimize frictional losses due to slipping and rolling resistance. Special coatings are applied to the contacting surfaces to control surface friction and wear. The hardness of the contacting surfaces is controlled to minimize the rolling resistance.

The mechanical interference fit forces in combination with the magnetic attractive forces determine the breakaway torque required to cause slipping between the rotor elements. Thus, the magnitude of the frictional forces between shaft drive wheel 140, drive wheel 122, and force transfer ring 150 together with the strength of the permanent magnets within bearing drive wheels 122, shaft drive wheel 140, and force transfer ring 150 determine when either rotor 118 or 120 might slip relative to the other. Although the enforced contact and therefore the torque capacity of the system can be increased by strengthening the interference fit and magnetic attractive forces, doing so causes greater frictional and/or magnetic losses.

Figure 6B:
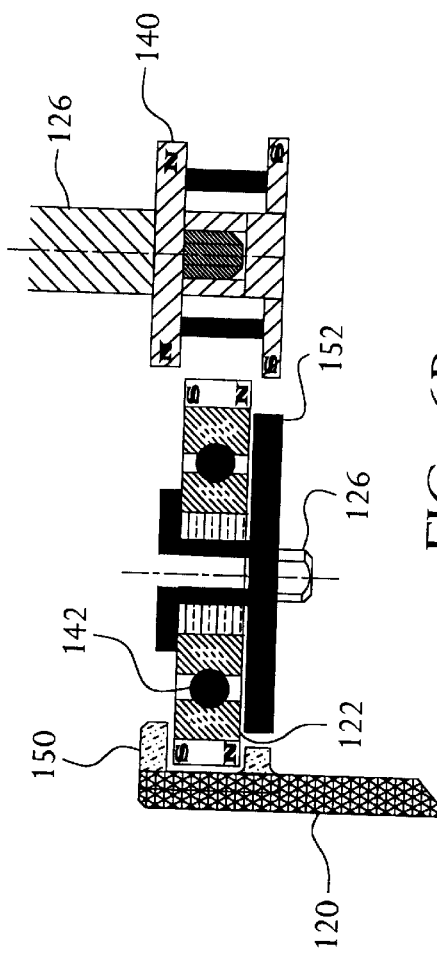
FIG. 6B provides a detailed view of the drive wheel assembly.
Figure 6C:
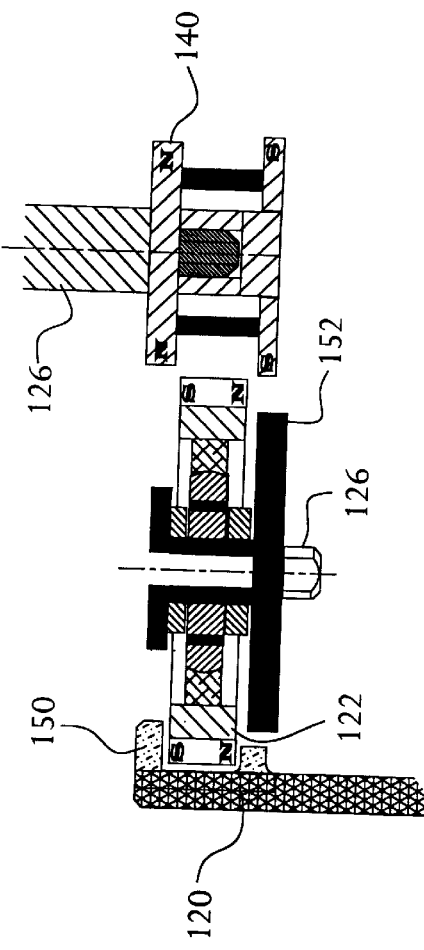
FIG. 6C provides a detailed view of an alternative embodiment of the drive wheel assembly.
Figure 6A:
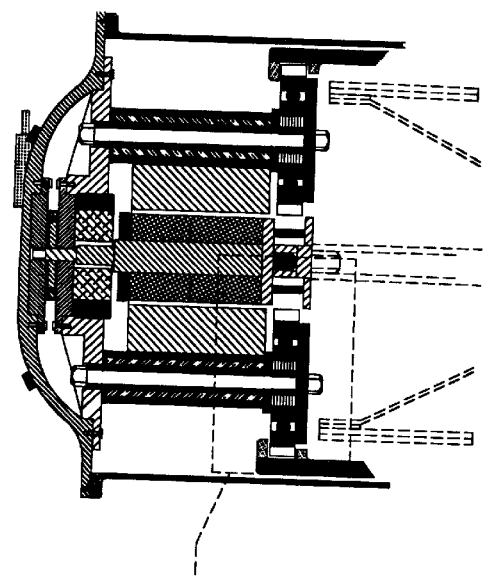
FIG. 6A provides a view of the mechanical bearings.

FIG. 6A provides an enlarged detailed view of mechanical bearing 142, post assembly 124, and bearing drive wheels 122. A stationary flux ring 152 has been incorporated into the assembly in order to direct the magnetic flux path of shaft drive wheel 140, drive wheel 122 and transfer ring 150. As shown, drive wheel 122 interacts with shaft drive wheel 140 and force transfer ring 150. Mechanical bearings 142 are driven by bearing drive wheels 122 which are coupled visa friction and/or passive magnetic force to central shaft 126 and outer containment rotor 120. Each bearing drive wheel 122 is supported by one bearing 142 and one stationary shaft or post 124. In the preferred embodiment, bearings 142 are of the type designated as outer-rotating-race bearings. In outer-rotating race bearings, the outer bearing raceway rotates and the inner race is stationary. The inner (stationary) raceway of each bearing is mounted onto one of stationary bearing posts 124 either directly or through a spacer. Bearing drive wheel 122 is concentrically mounted onto the outer race of bearing 142 allowing for drive wheel 122 and bearing 142 to rotate together. Each bearing 142 and bearing drive wheel 122 is thus supported by one stationary post 124.

FIG. 6B is an alternate drive bearing arrangement employing crowned outer diameter ("OD") thrust washers and needle bearings. Under some loading conditions the rotational axis of containment rotor 120 may not coincide with high speed flywheel rotor 118 nor be parallel to that of posts 124. Such may occur under severe gyroscopic conditions and structural loads. The crowned OD permits limited angular misalignment of high speed rotor 118, containment rotor 120, and post 124. This embodiment permits such deviations in operating geometry without damaging the drive mechanism or rotors, thereby permitting safer operation and longer life.

Figure 7A:
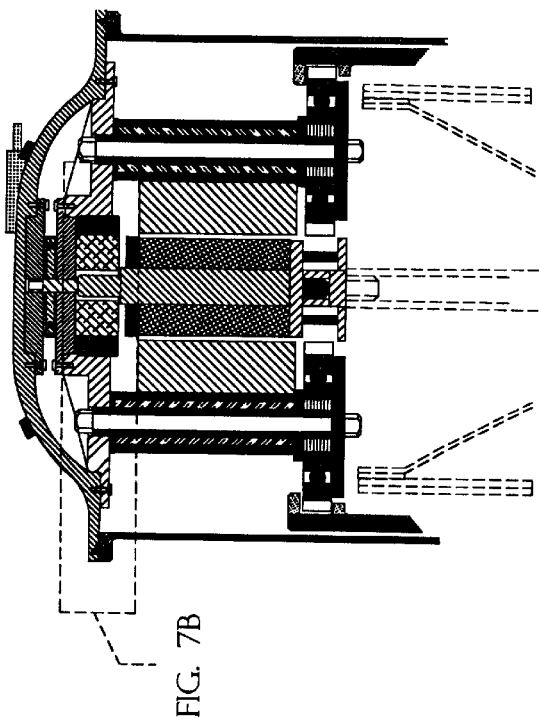
FIG. 7 provides a view of the suspension/drive system with a detailed view of the vacuum seal and axial bearing.
Figure 7B:
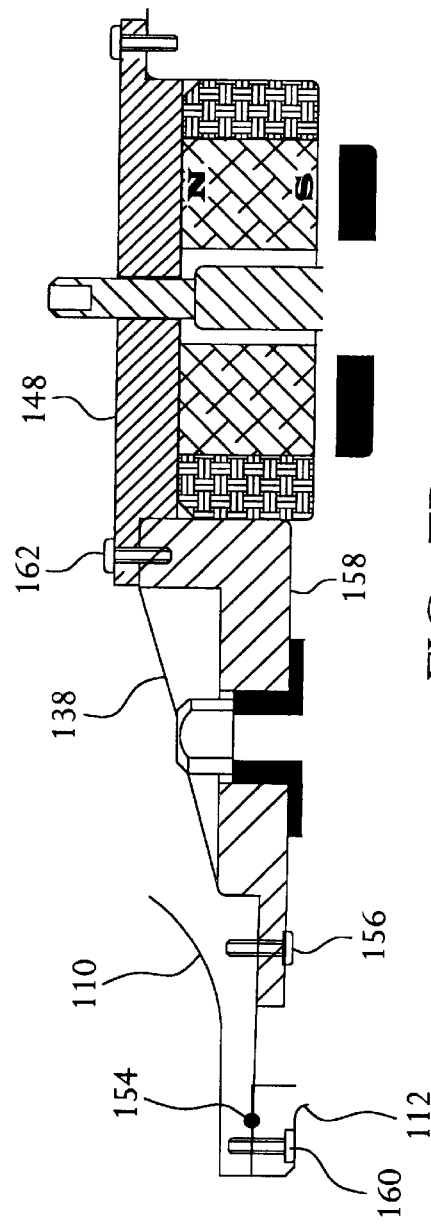

FIG. 7 provides an enlarged detailed view of the vacuum seal area of the flywheel system. Minimizing energy losses and maximizing efficiency dictates that high speed flywheels operate in a vacuum. As shown, "o-ring" elastomer seal 154 is applied at the joint between vacuum cylinder 112 and end cap 110. Elastomer seal 154 operates to seal the internal area of the battery flywheel system. Because the level of vacuum required is of the order of $10^{-5}$ Torr, penetrations of the housing need to be minimized. Thus, interior screw 156 pierces post tie-down static housing 158 but does not penetrate through end cap 110, thereby eliminating a leak path that might otherwise exist had screw 156 penetrated through end cap 110. Also, exterior screw 160 is attached external (on the pressure side) to the "o-ring" elastomer seal 154 offering maximum security for vacuum integrity. Screws 162 provide mechanical attachment of axial bearing 148.

Figure 8:
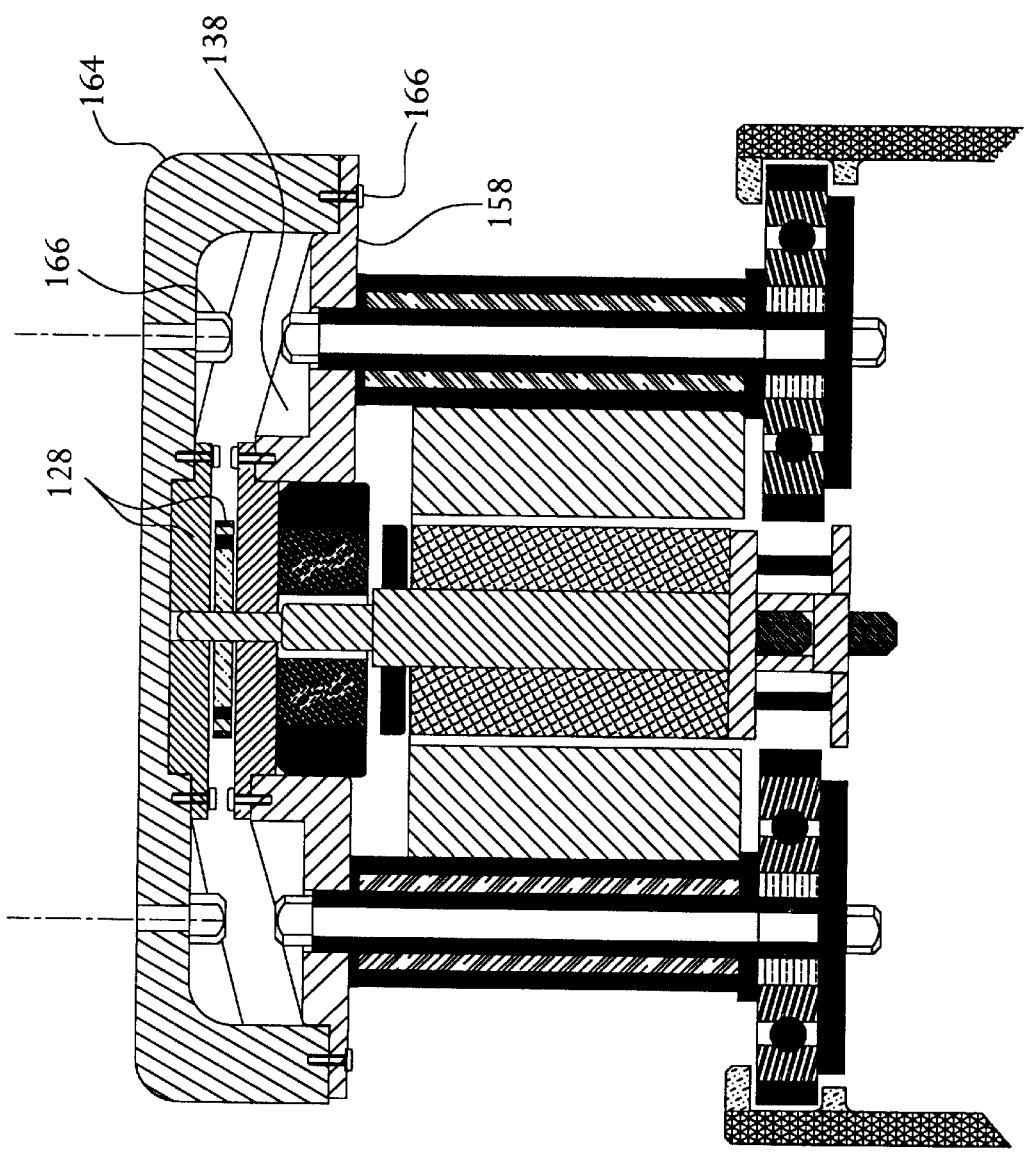
FIG. 8 provides a detailed view of a suspension/drive system without a vacuum chamber.
Figure 9B:
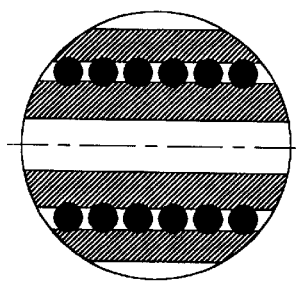
FIG. 9 provides a detailed view of the bearing posts of the inventive flywheel system of FIG. 2.
Figure 9B:
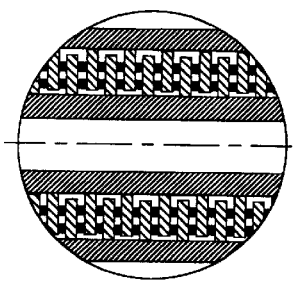
Figure 9B:
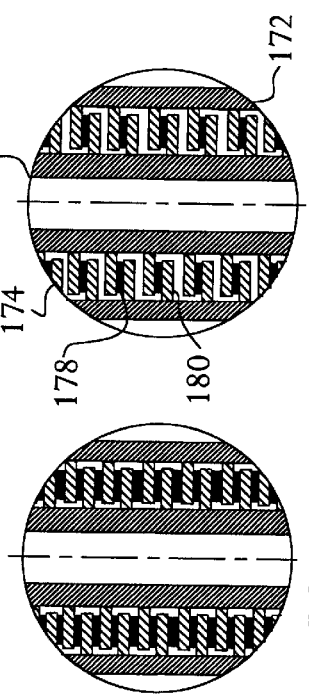
Figure 9A:
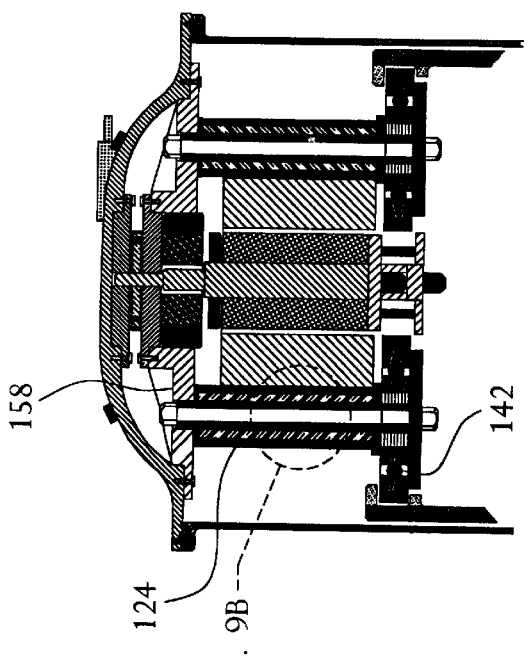

In some application environments, for example space, the need for a vacuum cylinder 112 is not necessary as the deployment environment provides the vacuum and the host vehicle provides a mounting structure. An example of such an environment is a satellite in outer-space. FIG. 8 illustrates an embodiment of the present system designed for such environments. As shown, end plate 164 can be attached to a body, such as a satellite with bolts 166. Post tie-down static housing 158 is attached to end plate 164 with bolts 166. Conspicuously missing from the embodiment is vacuum cylinder 112. Benefits of the rugged and robust structure shown in FIG. 8 include the following: maximum heat conduction and magnetic bearing cooling for motor/generator 128; maximum load torque and power capacity; increased strength and safety; and minimal vibration transmission to the rigid body.

FIG. 9 provides a detailed view of bearing post 124 and its related assemblies. Bearing post 124 comprises a thick-walled, hollow tube 170. The internal space of hollow tube 170 may house several elements. For example, hollow tube 170 may house a lubrication reservoir (not shown) and a pressurized fluid delivery system (not shown) which together provide a controlled flow of lubricant to each bearing 142. Hollow tube 170 might also house heat pipes (not shown) for transferring heat from each bearing 142 to post tie-down static housing 158.

Bearing posts 124 also provide passive damping of the rotor system so as to control the dynamic run out of the rotor elements. Bearing post 124 comprises a stationary, concentric metal tube 172 which is rigidly attached at one end to post tie-down static housing 158. The annular space between hollow tube 170 and concentric metal tube 172 is filled with elastomeric damping elements 174, which may be precompressed axially to enhance their damping characteristics.

Damping arises from the motion of hollow tube 170 relative to stationary concentric tube 172. In one embodiment, elastomeric damping element 174 within the annular space comprises elastomeric annular ring 178 sandwiched between thin metal disks 180. When hollow tube 170 moves, annular ring 178 is deformed and thereby provides damping. Alternative elastomer configurations such as o-rings, buttons and partial rings may be used in place of or in conjunction with full annular rings 178. The elastic and damping properties of the elastomeric material are chosen to maximize the effective damping coefficient of the mechanical suspension. Active magnetic bearings 146, 148 and elastomer "o-ring" seal 154 provide additional damping to the rotor system. Damping provides stability to the flywheel system, improved battery operating safety, and improved tolerance to undesirable imbalance, shock and vibration.

The design and operation of hybrid suspension/drive system 130 as described above may vary depending on the operational requirements of a particular application. For example, in applications where auxiliary power sources are available, greater fictional losses in the flywheel might be tolerated. For such applications, the lateral (i.e. in a radial direction perpendicular to the spin axis of rotor 118) support of shaft 126, high-speed rotor 118, and containment rotor 120 is provided by mechanical bearings 142 through the enforced mechanical contact with shaft drive wheel 140 and force transfer ring 150 while magnetic bearings 146,148 are used to provide rotor balance correction and additional axial support. Thus, for applications where operational losses is not an issue, an embodiment providing full contact radial support may be appropriate.

In applications where on-board auxiliary energy storage is limited and where the flywheel must maintain kinetic energy while the vehicle is out of service, minimum frictional loss in the bearings is a necessity to minimize drag torque and the resulting speed decay of the flywheel. For such applications, the design of the mechanical suspension may be modified so that magnetic bearings 146, 148 entirely support shaft 126 and high-speed rotor 118 over the operating speed cycle of the flywheel. The mechanical suspension elements 122, 124 are used only to limit the amplitude of the transient shaft excursions caused by shock loads to the rotor system.

In such an embodiment of suspension/drive system 130, radial clearance opens between the bore of shaft drive wheel 140 and the outer diameter of shaft 126 as rotor 118 accelerates to operating speed. The radial clearance begins to open at a speed just below the minimal operating speed of the battery's high speed rotor 118 and increases as the speed increases to the maximum operating speed of the battery's high speed rotor 118. The radial clearance removes the enforced contact but not magnetic interaction between shaft 126 and shaft drive wheel 140. In this mode of operation, shaft drive wheel 140 functions as a touchdown bearing for shaft 126 and high-speed rotor 118. The peripheral speed of shaft 126 and shaft drive wheel 140 is magnetically matched so that the contacting surface: have equal surface velocity during touchdown. This feature of the invention minimizes the energy loss during a touchdown event.

In the prior art, touchdown bearings are normally non-rotating mechanical bearings surrounding a shaft at each shaft end. During a touchdown event in prior systems, the flywheel must give up some of its kinetic energy in order to rapidly accelerate the bearing races and balls. The drag torque produced by the acceleration of the touchdown bearing elements can excite undesirable whirl excursions of the rotor. In contrast, in the present system, flywheel kinetic energy loss is negligible because the contacting surfaces of shaft 126 and shaft wheel 140 have zero relative velocity, i.e. they rotate at the same velocity. This feature of the present invention also reduces the magnitude of the lateral excursions of the high-speed rotor caused by shock loading. The excursions are limited because the radial clearance between shaft 126 and shaft drive wheel 140 is intentionally small and the drag torque is small because the contacting surfaces have equal velocities.

Because the touch down bearings of this particular embodiment are more tolerant of overload conditions, the primary magnetic suspension need not be as robust as they otherwise might need to be. Specifically, the size and force capability of radial magnetic bearings 146 may be smaller than those used in a conventional magnetically supported flywheel rotor with non-rotating touchdown bearings. Action of shaft drive wheel 140 limits shaft excursions that result from shock loads, enabling smaller magnetic bearings 146 to quickly restore alignment of rotor spin shaft 126 with lower magnetic force.

When the flywheel is out of service or in standby mode, the magnetic suspension 146, 148 provides minimum bearing drag and speed decay. To further reduce frictional loss, containment rotor 120 is decelerated to reduce the bearing drag of mechanical bearings 142. Via electronic control and management of multiple motor/generators, the kinetic energy of containment rotor 120 can be transferred to high-speed rotor 118 as containment rotor 120 is decelerated but nevertheless continues to maintain momentum management.

Figure 10:
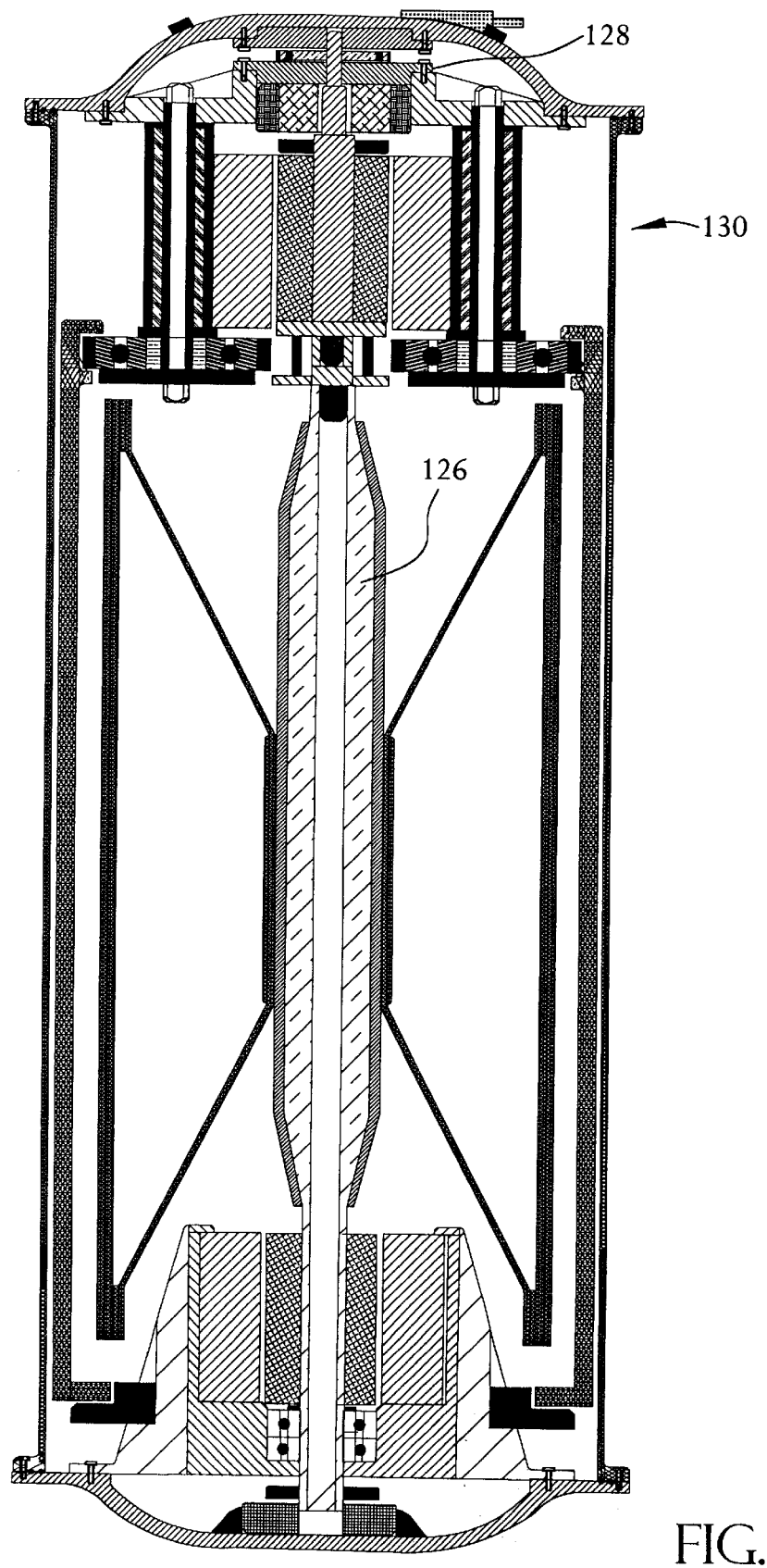
FIG. 10 provides a sectional view of an alternative embodiment having a compact single drive mechanical flywheel battery system.

FIG. 10 provides a side sectional view of an alternate embodiment of the inventive flywheel system having a single suspension/drive mechanism 130 and a single two stator motor/generator 128. As noted above, with reference to FIG. 2, a suspension/drive mechanism 130 may be located at each end of shaft 126. In contrast, in the embodiment of FIG. 10, suspension/drive mechanism 130 is located at only one end of shaft 126. Additionally, for certain applications where the torque and power of dual motors and dual drives is not warranted, a single motor/generator 128 can be employed. The suspension/drive system 130 of FIG. 10 provides for lower cost and weight as well as efficient use of available space.

Figure 11:
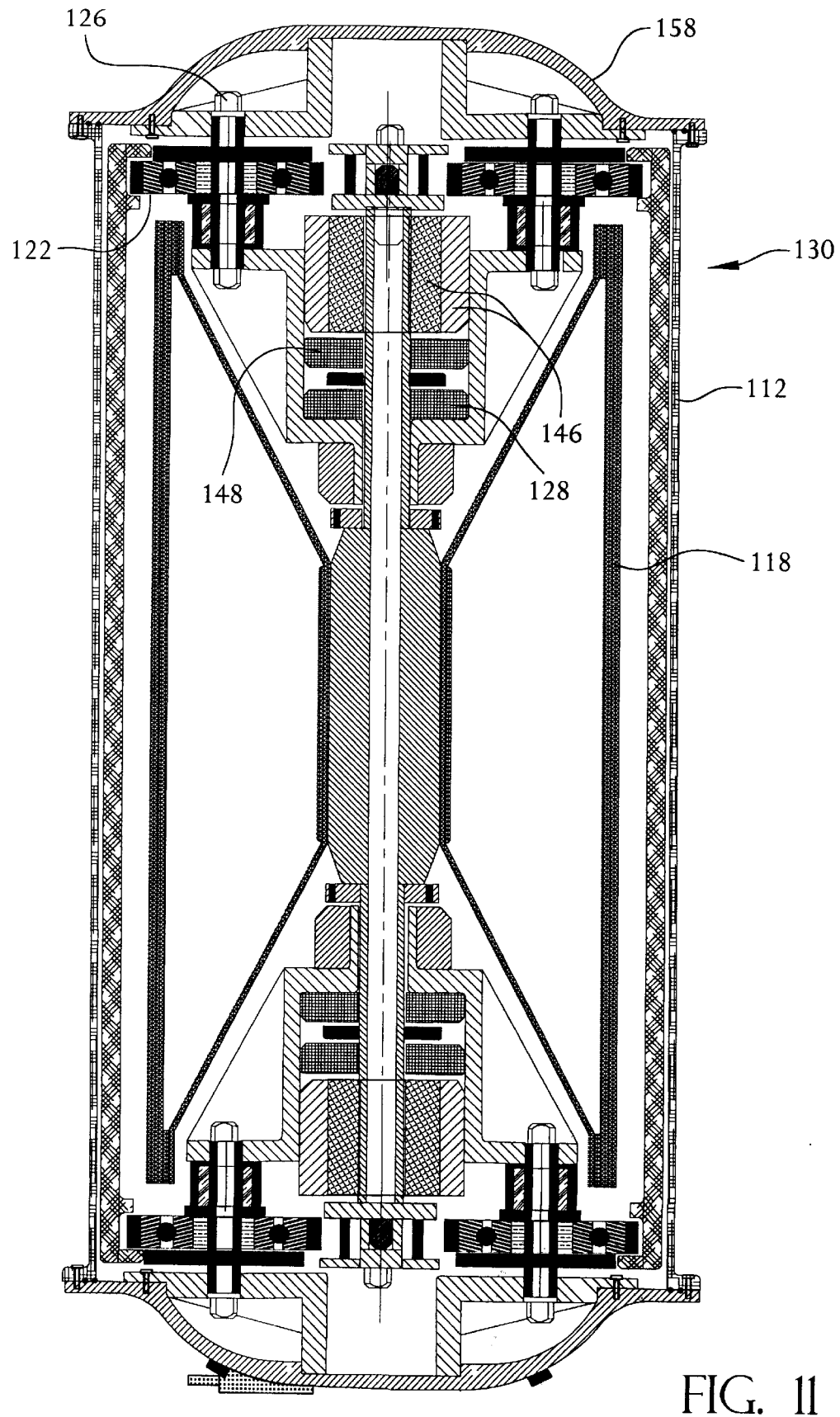
FIG. 11 provides a sectional view of the inventive flywheel system with a converse suspension/drive system.

FIG. 11 provides a side sectional view of an embodiment of the inventive flywheel battery system having a converse drive/suspension system 130. As shown, the positions of posts 124, bearings 142, and drive wheels 122 relative to magnetic bearings 146 and 148 and motor/generator 128 has been reversed from that previously described with reference to FIG. 2. In contrast to the drive/suspension system described above, magnetic bearings 146 and 148 and motor/generators 128 are substantially positioned within the interior, i.e. outer diameter, of high speed rotor 118. The arrangement minimizes the axial extension of vacuum cylinder 112 and associated post tie-down static housing 158. This embodiment may be particularly useful in applications requiring minimal axial dimensions.

Figure 12A:
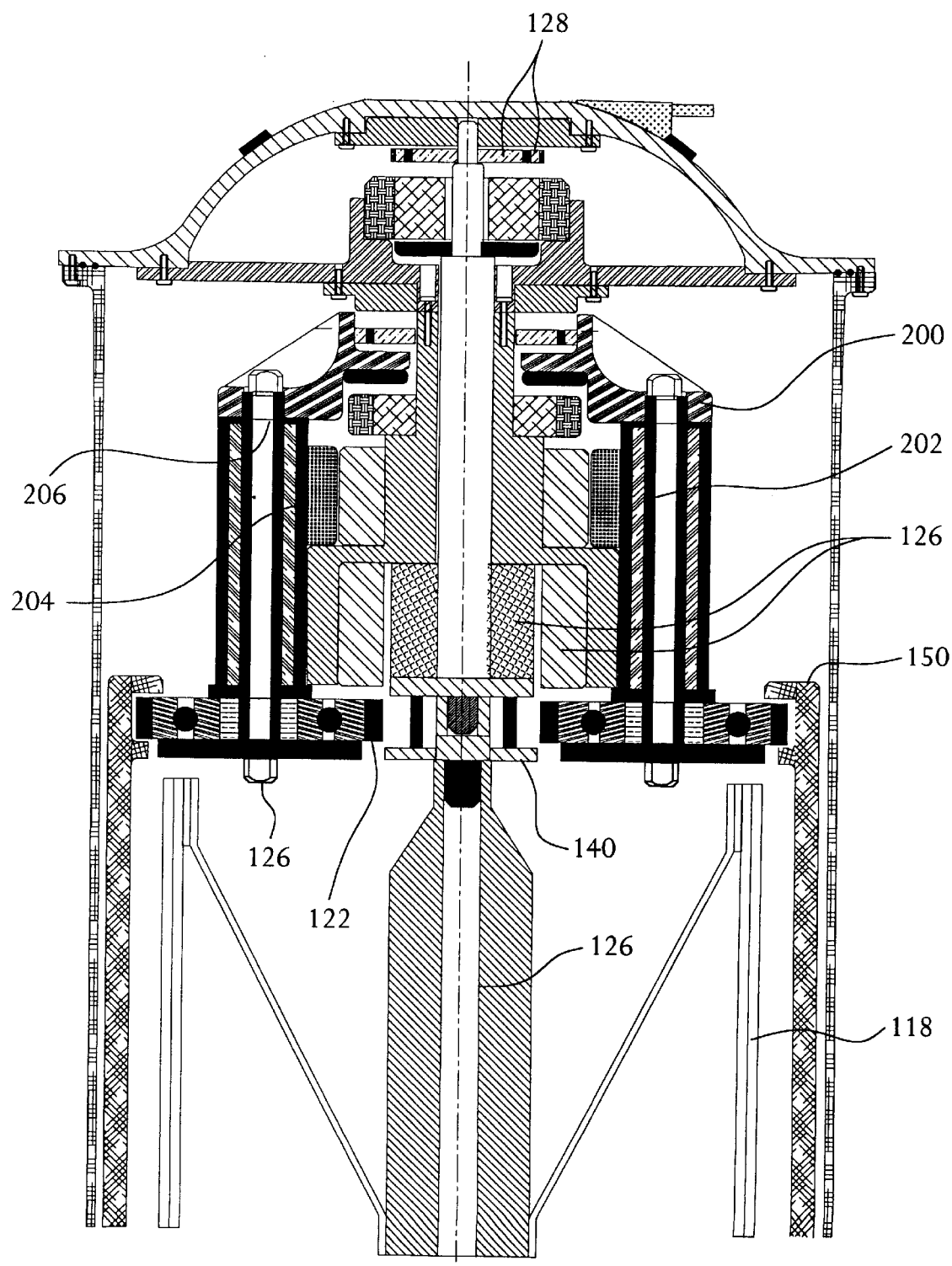
FIG. 12A and 12B provides a sectional view of the inventive flywheel system with a planetary suspension/drive system.

FIG. 12A provides another alternative embodiment of the inventive counter-rotating flywheel battery system. The embodiment of FIG. 12A comprises a planetary drive system whereby drive wheels 122, in addition to rotating about posts 124, rotate in a planetary configuration around the spin axis 126 of high speed rotor 118. In this planetary drive system, each bearing post assembly 124 is attached to planetary shaft 200. Planetary shaft 200 rotates around stationary body 202 which is arranged co-axially with shaft 126. To allow for this rotation, planetary shaft 200 has its own set of radial magnetic bearings 204 and axial magnetic bearings 206. Magnetic bearings 204 and 206 may be a combination of both passive and active magnetic bearings.

Figure 12B:
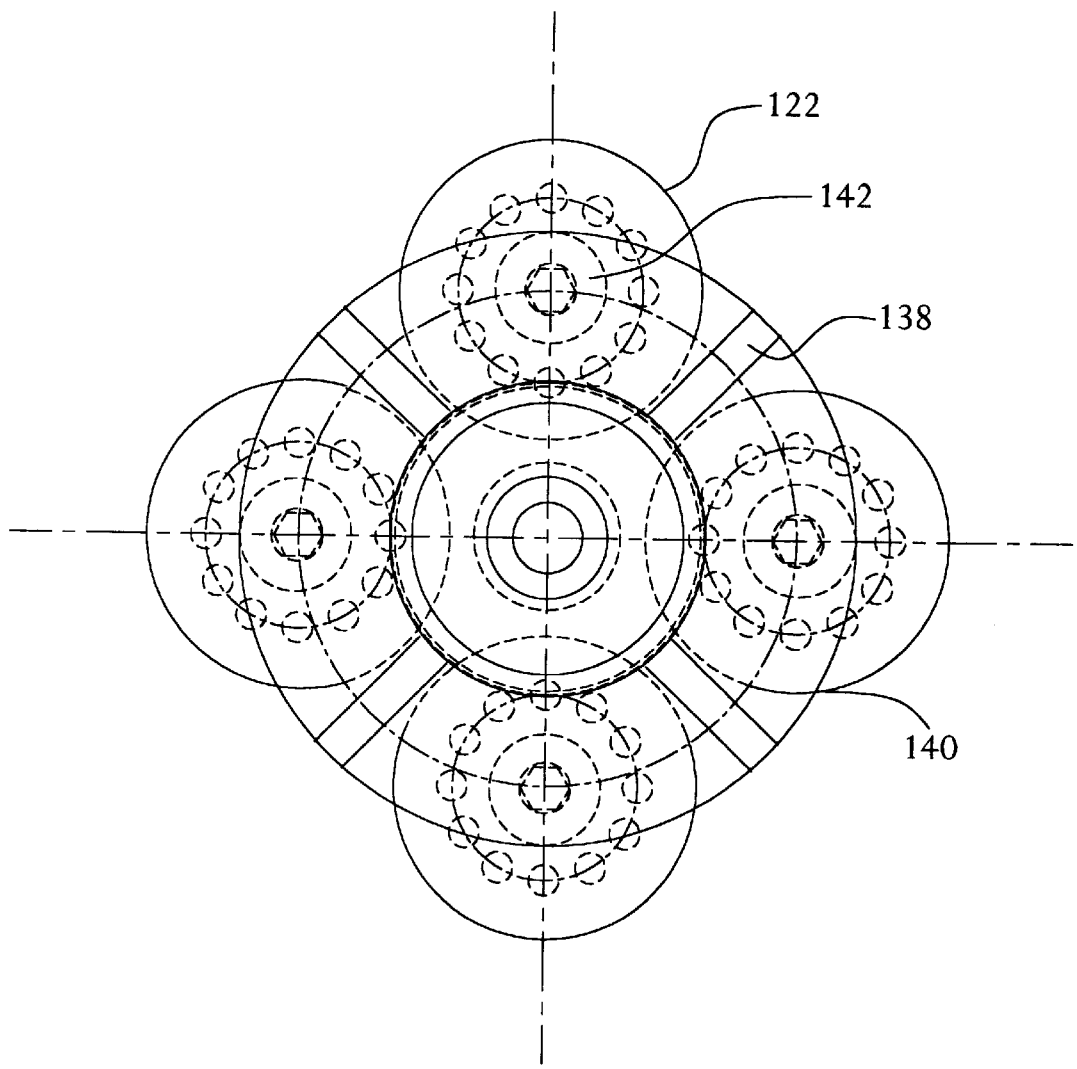

Mechanical bearings 142 and related bearing wheels 122 are free to rotate about posts 124. Thus, as planetary shaft 200 and drive wheels 124 are rotated about central high speed shaft 126, mechanical bearings 126 and drive wheels 122 rotate about post 124. FIG. 12B provides a view of the system taken from line B—B.

Planetary shaft 200 is driven around stationary body 202 by motor/generator 208. High speed rotor 118 is driven by motor/generator 128. The rotational velocity of mechanical bearings 142 and drive wheels 122 is dictated by the relative speeds with which motor/generators 128 and 208 are driven and the contact and magnetic coupling that exists between drive wheels 122, shaft wheel 140 and force transfer ring 150. By managing the rotational frequencies of the two motor/generators 128 and 208, the relative rotational velocities of bearings 142, rotor 118, and containment rotor 120 can be controlled. It should be noted that instead of connecting alternatively either rotor 118 or planetary shaft 200 to a motor/generator, each of drive wheels 122 could be connected to a motor generator and thereby provide the same degree of control over the relative rotational frequencies of rotor 118, containment rotor 120, and drive wheels 122.

A planetary drive system such as the one described provides numerous benefits. Application of motors to two of either rotor 118, planetary shaft 120, or drive wheels 122, provides for precise management of the relative rotational frequencies of rotors 118 and 120 without the necessity of adjusting or altering the size of components 122, 142, and 140. Such precise management offers increased control as well as the ability to dynamically vary the relative net momentum and resulting gyroscopic load. Further, the planetary multiple motor/generator embodiment enables the flywheel system to offer increased energy storage, motor torque, power, and specific energy.

Figure 13:
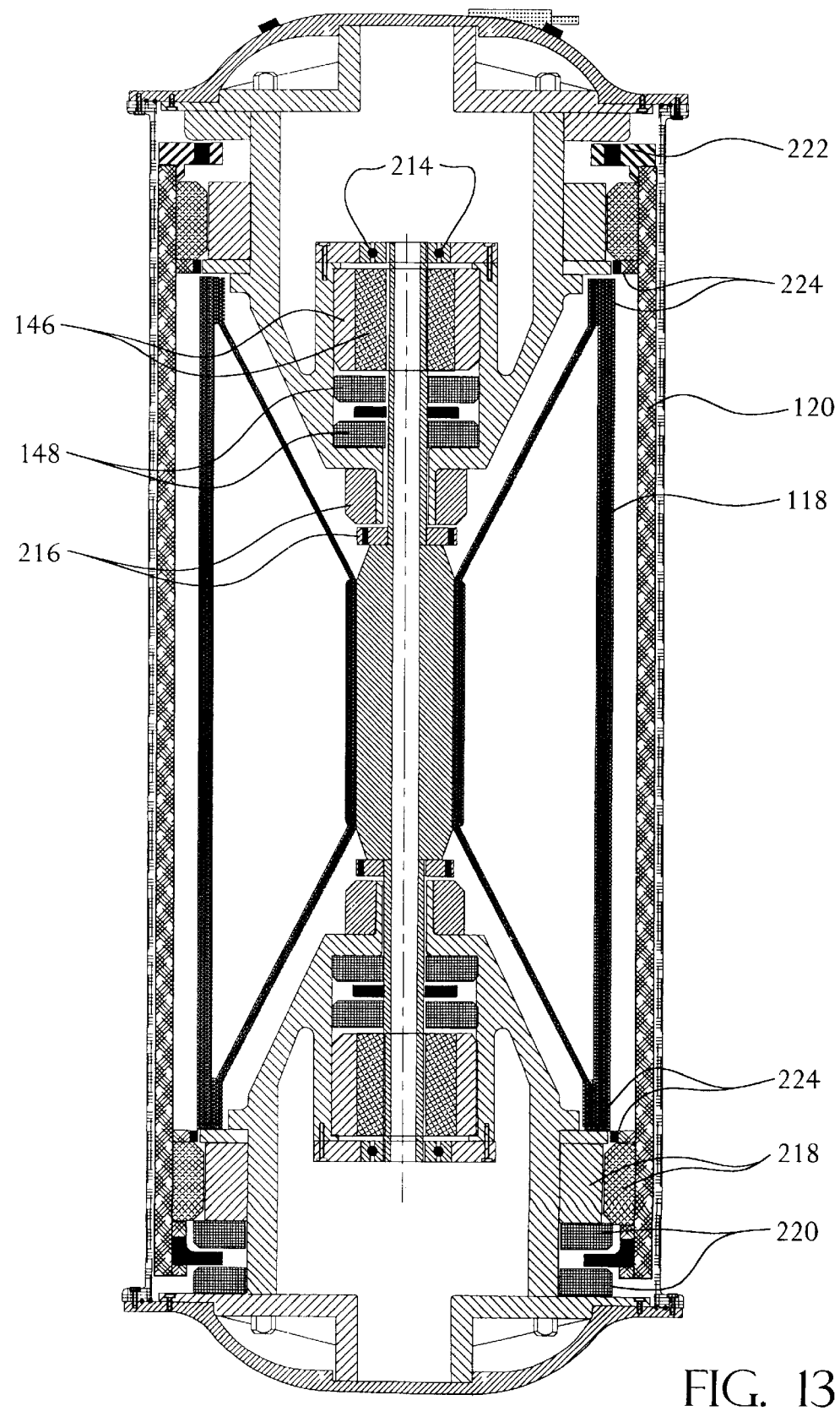
FIG. 13 provides a detailed view of the inventive flywheel system with a direct rotor drive system.

FIG. 13 provides still yet another embodiment of the inventive flywheel battery system. The system of FIG. 13 is a direct drive system whereby each of rotor 118 and containment rotor 120 are coupled to motor/generators 216 and 222. Notably absent from the system of FIG. 13, is drive/suspension system 130 which in previously described embodiments provided coupling between rotor 118 and containment rotor 120. Rather, in the embodiment of FIG. 13, the net momentum is managed through synchronization of multiple rotors 216, 222. In the embodiment of FIG. 13, high speed rotor 118 is supported on radial magnetic bearings 146 and axial magnetic bearings 148. Motor/generators 216 power high speed rotor 118 which is supported upon shaft 126 by attached shaft mounted mechanical touchdown bearings. Mechanical touchdown bearings 214 are provided in the case of overload of high speed magnetic bearings 146. Magnetic axial bearing 220 and magnetic radial bearing 218 support containment rotor 120 with lower speed and high torque motor generator 222 supplying energy and power. Contact rub touchdown bearings 224 are provided for overload of the lower speed containment rotor's magnetic bearings. The embodiment of FIG. 13 is an inside-out design with respect to the containment rotor 120 and a conventional design with respect to the high-speed rotor 118.

Aside from the novel elements of the above described battery flywheel system, high speed rotor 118 has been especially designed to have minimum weight, low inertia, maximum energy and very high specific energy and is novel and inventive unto itself. Generally, a flywheel rotor provides a means to store energy as rotational kinetic energy. Designing a minimal weight rotor that will withstand the stresses experienced at the extremely high rotational speeds at which flywheels operate, and also provide an adequate main source of stored kinetic energy has been a constant challenge in the art. A rotor acting as a source of stored energy must operate at acceptable natural frequencies, have acceptable vibration/acoustical signature for the flywheel system, generate acceptable torque for power delivery, and have a configuration that is practical for manufacturing and balancing. At very high rotational speeds, rotors often experience substantial centrifugal forces which can cause the rotors to be distorted or "grow" radially away from the rotational axis. This "growth" can become so great that it may well exceed the strengths of the rotor materials. In such cases, a rotor might experience component separation potentially leading to catastrophic failure and fragmentation. Attempts to control these problems by reduction in radial size (i.e., diameter) requires a lengthening and/or a corresponding increase in spin speed to maintain desired energy levels at minimum weight and minimal inertia. These changes only exacerbate dynamics problems associated with the natural frequencies and critical speeds of high speed rotors, place additional demands upon the limits of the structural materials, increase axial envelope geometry, and further reduce the torque transmission capabilities of the flywheel rotor. Therefore, it is a challenge in the art to design a minimal weight flywheel battery rotor which accommodates excessive radial growth and yet remains rigid so as to be a useful mechanical energy storage medium.

The inventive minimal weight, maximum specific energy high speed rotor 118 has been especially designed to compensate for radial growth and also to be sufficiently stiff so as to be an adequate torque transfer medium. By application of unique design concepts such as a tapered section, composite rims, and interface sections, discriminatingly balanced with delicate mechanical assembly control and techniques, a high energy density flywheel rotor has been developed which is suitable to many applications.

Figure 14:
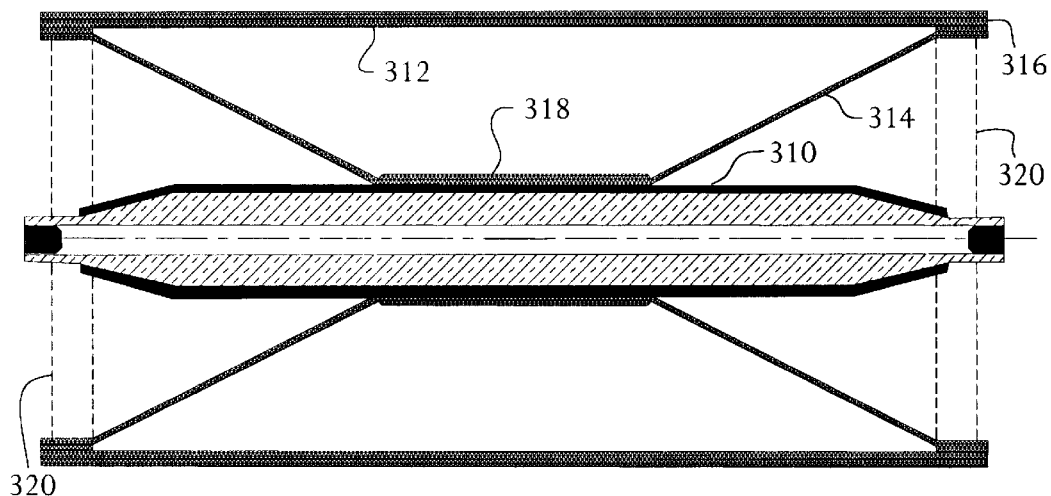
FIG. 14 provides a view of the inventive high speed rotor with a straight tapered transition section.
Figure 15:
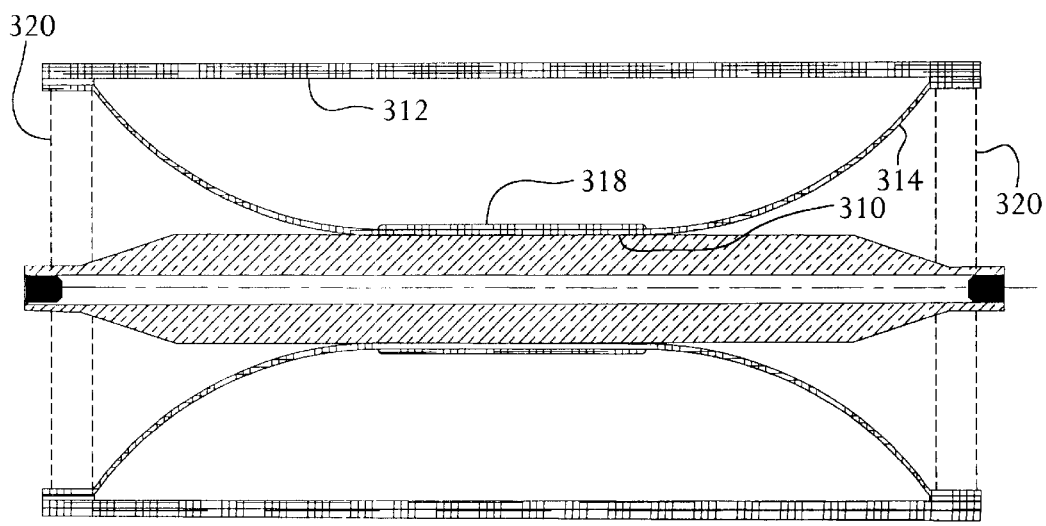
FIG. 15 provides a view of the inventive high speed rotor with a parabolic tapered transition section.
Figure 16:
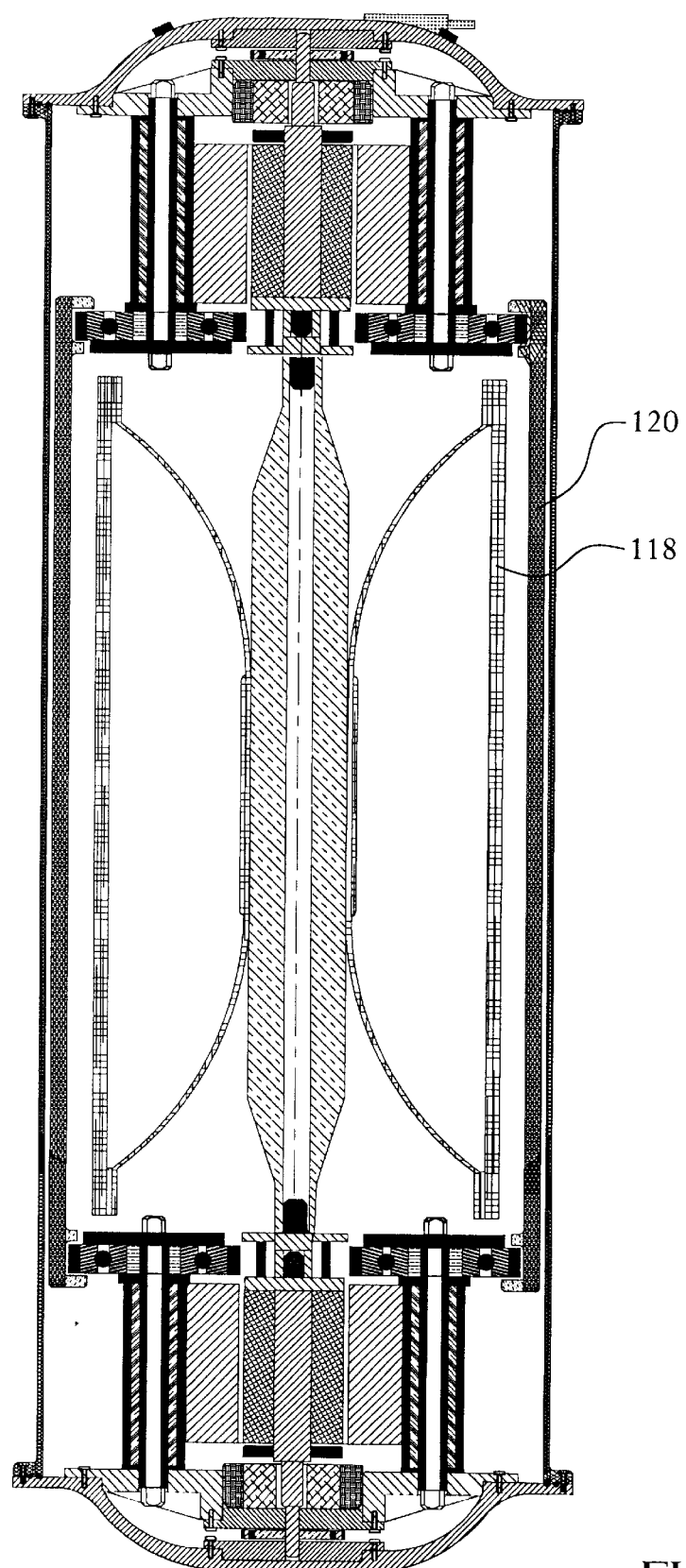
FIG. 16 provides a view of the inventive flywheel battery system having a high speed rotor with a parabolic tapered transition section.

FIG. 14 provides a side sectional view of inventive high speed rotor 118. As shown, rotor 118 has an inner rim section 310 and a longer outer rim section 312. Transitional or hub section 314 is tapered between inner rim section 310 and outer rim section 312. Transitional section 314 is mechanically fit to outer rim section 312 via spacers 316. FIG. 15 provides a view of an alternative rotor design with a curved or parabolic transition section 314. FIG. 16 illustrates a complete flywheel battery system having a rotor 118 with a parabolic transition section 314 incorporating the inventive drive/suspension system 130.

The materials from which rotor 118 is composed were especially selected to operate optimally under high rotational velocities. A critical consideration in rotor design is the rotor's ratio of rotational kinetic energy to angular momentum. It is preferable to have the largest possible ratio thereby requiring the highest possible spin speed of operation. A rotor should rotate very quickly so as to store large amounts of energy but should have managed angular momentum so that the rotor can be accelerated and decelerated without significant deformation. It is also preferable for a rotor to have a high ratio of rotational kinetic energy to rotational inertia. A high ratio provides for maximum storage of kinetic energy at minimum rotational inertia, again requiring the highest possible spin speed of operation. Minimized rotational inertia provides for minimum torque for acceleration and deceleration of the rotor.

The inventors have determined that composite materials most adequately satisfy these criteria although other materials may be substituted depending upon application of the rotor. Composite materials with the highest available specific strength are used in high-speed rotor 118 to achieve the highest possible value of rotational kinetic energy to angular momentum ratio and the maximum value of specific energy of the rotor. Similarly, composite materials provide the rotor with a high ratio of rotational kinetic energy to rotational inertia. Thus, the rotor provides for maximum kinetic energy storage with minimum angular momentum transfer to containment rotor 120 during flywheel failure and maintain net momentum balance with containment rotor 120 for minimal gyroscopic forces. Further, rotor 118 requires only minimal torque for acceleration and deceleration but can accommodate maximum motor generator torque requirements to satisfy peak power demands from the flywheel battery system.

A rotor manufactured from composite materials offers additional benefits. The use of composite materials minimizes the amount of metallic materials in the flywheel rotor. Therefore, the potential for metallic shrapnel to be present in a burst scenario is reduced, thereby benefiting the demands on, and requirements of the containment rotor 120. Composite materials are also light in weight and therefore provide an optimal material to be used in mobile applications.

Inner rim section 310 and outer rim section 312 have a circumference filament wound construction, i.e. the filaments or fibers of the composite (fibers and matrix) are wound in a circumferential direction, i.e. tangent to the radius of the composite rotor. Such a configuration offers significant strength in the direction of the fibers, i.e. tangential to the radial direction and perpendicular to the spin axis. The composite fiber content in the radial or axial directions is generally minimized to insure maximum tangential fiber content and therefore component strength in the tangential direction, but also insuring acceptable component strength in other directions. Thus, the principal direction of strength of the material (i.e. along the fibers) is primarily oriented in the direction required to carry the centrifugal load (tangential) and therefore some fibers may be applied in other directions (axial and/or radial) to insure structural integrity as required.

Wound rotor construction allows for minimal weight, maximum rotational speed and energy storage. However, this method of construction offers reduced strength in directions normal or perpendicular to the fiber direction, i.e. transverse direction. Helical wraps, i.e. a combination of axial and circumferential fiber lay, or radial fibers may be implemented to offer some structural integrity in the axial and/or radial direction. Further, inner 310 and outer rim 312 sections may be constructed of multiple rims pressed together to reduce undesirable stress levels. Alternately, the rims may be manufactured by grading, i.e. varying the material, fiber volume, and fiber matrix, the wound composite material to minimize undesirable stress levels and/or deformation patterns.

Hub or transition section 314 is critical to the overall rotor design. Hub 314, like inner rim section 310, outer rim section 312 and spacer 316 are manufactured from fiber composite material. Hub 314 is tapered between inner rim section 310 and outer rim section 312. When rotor 118 is viewed as a whole, transition sections 314 can be said to form a conical shape which joins inner 310 and outer rim sections 312. Preferably the taper angle to the conical transition section 314 is 10 to 40 degrees inclusive, measured from the rotational axis of the inner rim. The tapered transition section along with the composite makeup of hub 314 allows for large relative radial growth between inner rim section 310 and outer rim section 312. By allowing for large relative radial growth in the order of 0.070 inches for a rotor operating at the outer diameter peripheral speed of approximately 1400 meters per second, transition section 314 provides the mechanism for the rotor elements 310, 312, and 316 to remain engaged during high rotational frequencies when outer rim 312 may undergo significant "growth." Also, the transition section offers the static and at-speed deformation patterns required to provide structural compatibility of deformations at all interfacing flywheel components. The dual composite cone design offers sufficient axial and radial stiffness to minimize undesired natural frequencies and dynamic deformations within the operating range. Additionally, the composite cone design offers excellent torque transmission capacity for power delivery and replenishment of the flywheel's rotor energy at minimum weight.

The smaller or narrower end of the transition section 314 functions as the contact element between the inner rim 310 and the conical transition section 314. A high stiffness banding (over wrap) 318 is incorporated to reduce radial growth of inner rim 310 as well as to secure the narrower end of conical section 314 to inner rim 310 during operation.

Outer rim 312 mates with spacer 316 and spacer 316 mates with the large end of hub 314. Outer rim 312 is fitted with spacer 316 and spacer 316 is press fit to hub 314 employing an interference fit compatible with the design and materials in the system. Filament wound spacer ring 316 is provided to facilitate the assembly of outer rim 312 and conical transition hub 314 and to assist in maintaining compatibility of radial deformations between 314 and 312. Spacer ring 316 also provides additional stiffness to each end of rim 312.

The symmetrical nature of conical transition section 314 permits the convenient location of high speed rotor 118, magnetic and mechanical bearings 146, 148, and 214 and motor generator 216 as shown in FIG. 11, and also provides multiple balance planes (not shown) interior to the transition section 314 at the spacer interface 316. This interior location (within the rotor rim 312, spacer 316 and transition 314 assembly) is preferred for balance correction weights as operational centrifugal forces further bind the weights to rim 312. This is in contrast to exterior applied weights which have a tendency to "fly off" at high rotational speeds. Balancing of the rotor through removal of weight by mechanical means (grinding, drilling, etc.) is not desired as this may cause weakening of the composite material and result in premature failure of the rotor. Balance locations are accessible for maintenance and safe operation of the flywheel system.

The transition section 314 incorporates an additional special feature, a growth ring 320 (shown in dashed lines on FIG. 14). It is specially designed to compensate for the limitations in prior art by insuring centrifugal forces are developed to load the transition section 314 against the spacer 316 and correspondingly rim 312. This specially designed component is carefully matched in design to the remainder of components comprising the flywheel rotor as it is fabricated of special composite material intentionally mismatched in structural and centrifugal growth characteristics to provide desired centrifugal loading on the rim.

It is noted that rotor designs with a tapered transition section have been used in the past. For example, U.S. Pat. No. 5,012,694 ('694 Patent), entitled "High Speed Flywheel", describes a rotor employing a tapered section. In that patent, the transition section or hub was designed to radially grow outward at a rate faster than the outer rim. That outward growth induces beneficial radial forces on the rim sections which reduce the radial stress on the rim section at operating speeds. For limited rates of rotation, and lower specific energy designs such as that disclosed in the '694 Patent are satisfactory. However, the high rotational velocity and simultaneously maximization of the specific energy of the energy storage rotor 118 can well exceed those for which such systems have been designed. Under such circumstances, the transition section alone does not radially grow outward at a faster rate than do the rim components. A tapered transition section alone does not adequately compensate at such high speeds. Prior rotors do not provide an acceptable solution to following issues: deformation compatibility between the transition and rim components; transmission of loads from the flywheel to the shaft; structural rigidity; and operational safety. Therefore, there is a need for an improved minimal weight rotor which will operate at excessive rotational velocities.

The present inventive rotor 118 overcomes the limitations of prior designs and provides for higher specific energy rotors operational at higher rotational velocities. Specifically, the unique combination of tapered transition section 314, spacer 316, centrifugal loading of spacer 314, an assembly interface between transition section 314 and spacer 316, a growth ring 320, and a special rim assembly process enable the present rotor to operate at rotational velocities which prior rotors cannot.

In the present rotor, in contrast to those of the prior art, tapered transition 314 is used in conjunction with stiffening spacers 316. Spacers 316 provide stiffening and support to outer rim 312. In addition, spacers 316 provide a locally rigid section on rim 312 at which transition section 314 can be attached. Further, spacers 316 provide accessible locations for placement of balancing weights. Transition 314 is mechanically fit assembled to spacer 316 to further assist in providing compatibility of radial deformation patterns and for insuring mechanical load transmission to rims 312 for energy addition and extraction. Special growth rings further assist in that endeavor. Spacer 316 operates to force transition section 314 to follow the radial growth of rim 312 and reduce radial stresses at high operational speeds.

In addition to spacer 316 and the use of a growth ring 320 in transition section 314, rim 312 of the inventive rotor is assembled with an interference fit. Interference fit has the effect of reducing the radial stress incurred by rim 312 yet insures that separation of the multiple ring construction of 312 does not occur under normal operational conditions.

Therefore, the present inventive rotor 118 overcomes the limitations of the prior art. Specifically, the present rotor combines rims 310 and 312 manufactured with an interference fit, a tapered transition section 314 having a growth ring 320, and spacer 316 interference fit to rim 312 and transition section 314 to achieve specific energy levels and rotational velocities in rotor 118 not previously attained.

Table 1 provides details regarding an illustrative embodiment of the rotor section.

TABLE 1

| Component/Interface | Material | Mechanical Assembly Fit Between Components (inch interference fit per inch rotor outer diameter) | Manufacturing Method of Component |
| --- | --- | --- | --- |
| Outer Rim/Inner Rim | T-1000G/ERL 2258-mPDA | 0.001375 | Wet - wind |
| Inner Rim/Outer Rim | T-1000G/ERL 2258-mPDA | 0.0 | Wet - wind |
| Banding Ring/Transition | T-1000G/ERL 2258-mPDA | 0.0 | Wet - wind |
| Transition (Hub)/Shaft | T-1000G/ 977-2 or 950 | 0.000167 | Prepreg toe - wind |
| Transition (Hub)/Spacer | T-1000G/ 977-2 or 950 | 0.000334 | Prepreg toe - wind |
| Growth Ring (not shown)/Transition | S-Glass/ERL 2258-mPDA | 0.0 | Wet - wind |
| Spacer/Inner Rim | T-1000G/ 977-2 | 0.0 | Prepreg toe - wind |

Table 2 provides details regarding stress levels for an illustrative embodiment of the rotor section.

TABLE 2

| Assembly | Radial (lateral) Stress @ 0 mps/1400 mps** (psi) | Hoop (tangential) Stress @ 0 mps/1400 mps (psi) | Radial Deflection* @ 0 mps/1400 mps (inch) |
| --- | --- | --- | --- |
| Spacer/Transition | −900/−35 | −42,000/310,000 | −0.005/+0.065 |
| Spacer/Rim | −1700/−21 | −26,000/320,000 | −0.005/+0.065 |
| Inner Rim/Outer Rim | −4050/−35 | −4,000/460,000 | +0.009/+0.079 |

*NOTE:
All grow together 0.070 inch from their 0 rpm deflected locations
*NOTE:
mps is meters per second at the outer diameter of the rotor rim It will be appreciated by those skilled in the art that the foregoing has set forth the presently preferred embodiment of the invention and an illustrative embodiment of the invention but that numerous alternative embodiments are possible without departing from the novel teachings of the invention. Those skilled in the art will appreciate that numerous minor variations may be made to the disclosed suspension/drive system. For example various numbers of rotor wheels 122 could be employed. Likewise, various magnetic bearing configurations may be used. Further, the size and shapes of rotors 118 and 120 may vary depending on the particular needs of the application. Accordingly, all such modifications are intended to be included within the scope of the appended claims.

What is claimed is:

1. A flywheel system for storing and releasing energy comprising:
    an inner rotor rotatable about a first axis;
    an outer rotor rotatable about a second axis which intersects on at least one dimensional plane with said fist axis, said outer rotor counter-rotating relative to said inner rotor;
    a first plurality of drive wheels positioned around said first axis and movable interfacing with said inner rotor and a first end of said outer rotor; and
    a second plurality of drive wheels positioned around said second axis and movably interfacing with said inner rotor and a second end of said outer rotor,
    wherein said outer rotor is a containment vessel for said inner rotor, and said outer rotor substantially surrounds said inner rotor in a radial direction and restricts debris from said inner rotor in a radial direction, and said first plurality of drive wheels and said second plurality of drive wheels substantially surround said inner rotor in an axial direction and restrict debris from said inner rotor in an axial direction.

2. The flywheel system of claim 1, wherein said first axis is parallel to said second axis.

3. The flywheel system of claim 1, wherein said first and second axes are coincident.

4. The flywheel system of claim 1, wherein said inner rotor and said outer rotor are substantially cylindrical.

5. The flywheel system of claim 1, wherein a net momentum is generated upon counter-rotation of said inner and said outer rotors.

6. The flywheel system of claim 1, wherein an essentially net zero momentum is generated upon counter-rotation of said inner and said outer rotors.

7. The flywheel system of claim 1, wherein said inner rotor has an inertia relatively less than the inertia of said outer rotor.

8. The flywheel system of claim 1, wherein said inner rotor has a spin speed relatively greater than said outer rotor.

9. The flywheel system of claim 1 enclosed in a vacuum vessel.

10. The flywheel system of claim 1, wherein the relative rotational velocities of said inner rotor and said outer rotor are controlled to generate a preselected net momentum.

11. The flywheel system of claim 1, wherein said first plurality of drive wheels and said second plurality of drive wheels are positioned substantially parallel with the axis of said inner rotor at a radial distance from the center of said inner rotor, whereby movement of said inner rotor is transferred through said first plurality of drive wheels and said second plurality of drive wheels to said outer rotor causing said outer rotor to counter-rotate relative to said inner rotor.

12. The flywheel system of claim 1, further comprising:
    a drive shaft, said inner rotor being integrally connected to said drive shaft; and
    a plurality of being posts positioned substantially parallel to said drive shaft at a radial distance away from the axial center of said drive shaft, wherein one of said first plurality of drive wheels ad said second plurality of drive wheels is mounted on each of said plurality of bearing posts, said first plurality of drive wheels and said second plurality of drive wheels being movably interconnected with said inner rotor and said outer rotor whereby movement of said inner rotor is transferred through said plurality of drive wheels to said outer rotor causing said outer rotor to counter-rotate relative to said inner rotor.

13. The flywheel system of claim 1, further comprising:
    a drive shaft, said inner rotor being integrally connected to said drive shaft;
    a first shaft drive wheel rotatably mounted around the perimeter of said drive shaft, said first shaft drive wheel rotating with said drive shaft;
    a second shaft drive wheel rotatably mounted around the perimeter of said drive shaft, said second shaft drive wheel rotating with said drive shaft;
    a first force transfer ring integrally coupled to said outer rotor for transferring forces to and from said outer rotor, said first force transfer ring rotating with said outer rotor;
    a second force transfer ring integrally coupled to said outer rotor for transferring forces to and from said outer rotor, said second force tranferring rotating with said outer rotor,
    a plurality of bearing posts positioned substantially parallel to said drive shaft at a radial distance away from the axial center of said drive shaft;
    a plurality of beings movably rotatably mounted on said plurality of said bearing posts, wherein one of said first plurality of drive wheels and said second plurality of drive wheels is mounted on each of said bearings, said first plurality of drive wheels movably interconnected with said first force transfer ring and said first drive wheel, and said second plurality of drive wheels movably interconnected with said second force transfer ring and said second shaft drive wheel, whereby movement of said inner rotor is transferred trough said first shaft drive wheel and said second shaft drive wheel to said first plurality of drive wheels and said second plurality of drive wheels, and from said first plurality of drive wheels and said second plurality of drive wheels to said first force transfer ring and said second force transfer ring, thereby causing said outer rotor to counter-rotate relative to said inner rotor.

14. The system of claim 13, further comprising:
    radial magnetic bearings operably coupled around said central shaft for maintaining the radial position of said shaft relative to said drive wheels and the surrounding static structure;
    axial magnetic bearings operably coupled for maintaining the axial position of said shaft relative to containment rotor and surrounding static structure.

15. The system of claim 13, further comprising:
    rotating touchdown bearings operably coupled to said central shaft for limiting flywheel excursions during shock loading.

16. The system of claim 1, wherein said second rotor is a containment vessel.

17. The system of claim 1, further comprising:
    a first motor/generator capable of relative high rotational speeds operably connected to said first rotor; and
    a second motor/generator capable of lower rotational speeds relative to said first motor/generator but having a relatively greater torque capacity than said first motor/generator, operably connected to said second rotor.

* * * * *